(12) United States Patent
Chen

(10) Patent No.: US 12,430,706 B2
(45) Date of Patent: Sep. 30, 2025

(54) IMAGE FRAME STORAGE METHOD, PHOTOGRAPHING METHOD, AND ELECTRONIC DEVICE

(71) Applicant: Huawei Technologies Co., Ltd., Shenzhen (CN)

(72) Inventor: Xi Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 346 days.

(21) Appl. No.: 18/251,331

(22) PCT Filed: Oct. 30, 2021

(86) PCT No.: PCT/CN2021/127749
§ 371 (c)(1),
(2) Date: May 1, 2023

(87) PCT Pub. No.: WO2022/089621
PCT Pub. Date: May 5, 2022

(65) Prior Publication Data
US 2024/0005442 A1 Jan. 4, 2024

(30) Foreign Application Priority Data

Oct. 31, 2020 (CN) .......................... 202011199064.0
Dec. 25, 2020 (CN) .......................... 202011574651.3

(51) Int. Cl.
G06T 1/20 (2006.01)
G06T 7/00 (2017.01)
G06V 10/74 (2022.01)

(52) U.S. Cl.
CPC .............. *G06T 1/20* (2013.01); *G06T 7/0002* (2013.01); *G06V 10/761* (2022.01); *G06T 2207/30168* (2013.01)

(58) Field of Classification Search
CPC ..................... G06T 1/20; G06T 7/0002; G06T 2207/30168; G06V 10/761
USPC .......................................................... 382/305
See application file for complete search history.

(56) References Cited

U.S. PATENT DOCUMENTS

| 10,462,381 | B2 | 10/2019 | Murphy et al. | |
| 2006/0221223 | A1* | 10/2006 | Terada | H04N 23/71 348/333.05 |
| 2007/0081813 | A1 | 4/2007 | Hong et al. | |
| 2014/0240537 | A1* | 8/2014 | Nakada | H04N 1/00336 348/231.2 |

(Continued)

FOREIGN PATENT DOCUMENTS

| CN | 104580908 A | 4/2015 |
| CN | 104767933 A | 7/2015 |

(Continued)

*Primary Examiner* — Allen H Nguyen
(74) *Attorney, Agent, or Firm* — Conley Rose, P.C.

(57) ABSTRACT

An image frame storage method is applied to an electronic device, where a maximum frame quantity of image frames that are allowed to be stored in a first storage space of the electronic device is N, where N is a positive integer. The method includes collecting a first image frame within first duration, where every m first image frames consecutively collected within the first duration are a group of image frames; and storing a second image frame that meets an image quality condition and that is in the first image frame into the first storage space.

20 Claims, 23 Drawing Sheets

(56) References Cited

U.S. PATENT DOCUMENTS

| | | | |
|---|---|---|---|
| 2018/0278257 A1 | 9/2018 | Omori | |
| 2019/0034746 A1* | 1/2019 | Feng | .................... G06T 7/0002 |
| 2023/0396783 A1* | 12/2023 | Li | .................... H04N 21/4402 |

FOREIGN PATENT DOCUMENTS

| | | |
|---|---|---|
| CN | 105224409 A | 1/2016 |
| CN | 106326908 A | 1/2017 |
| CN | 107172296 A | 9/2017 |
| CN | 107302664 A | 10/2017 |
| CN | 107615745 A | 1/2018 |
| CN | 108322656 A | 7/2018 |
| CN | 110049247 A | 7/2019 |
| CN | 110213202 A | 9/2019 |
| CN | 110399842 A | 11/2019 |
| WO | 2018161118 A1 | 9/2018 |
| WO | 2019104185 A1 | 5/2019 |
| WO | 2020155052 A1 | 8/2020 |

\* cited by examiner

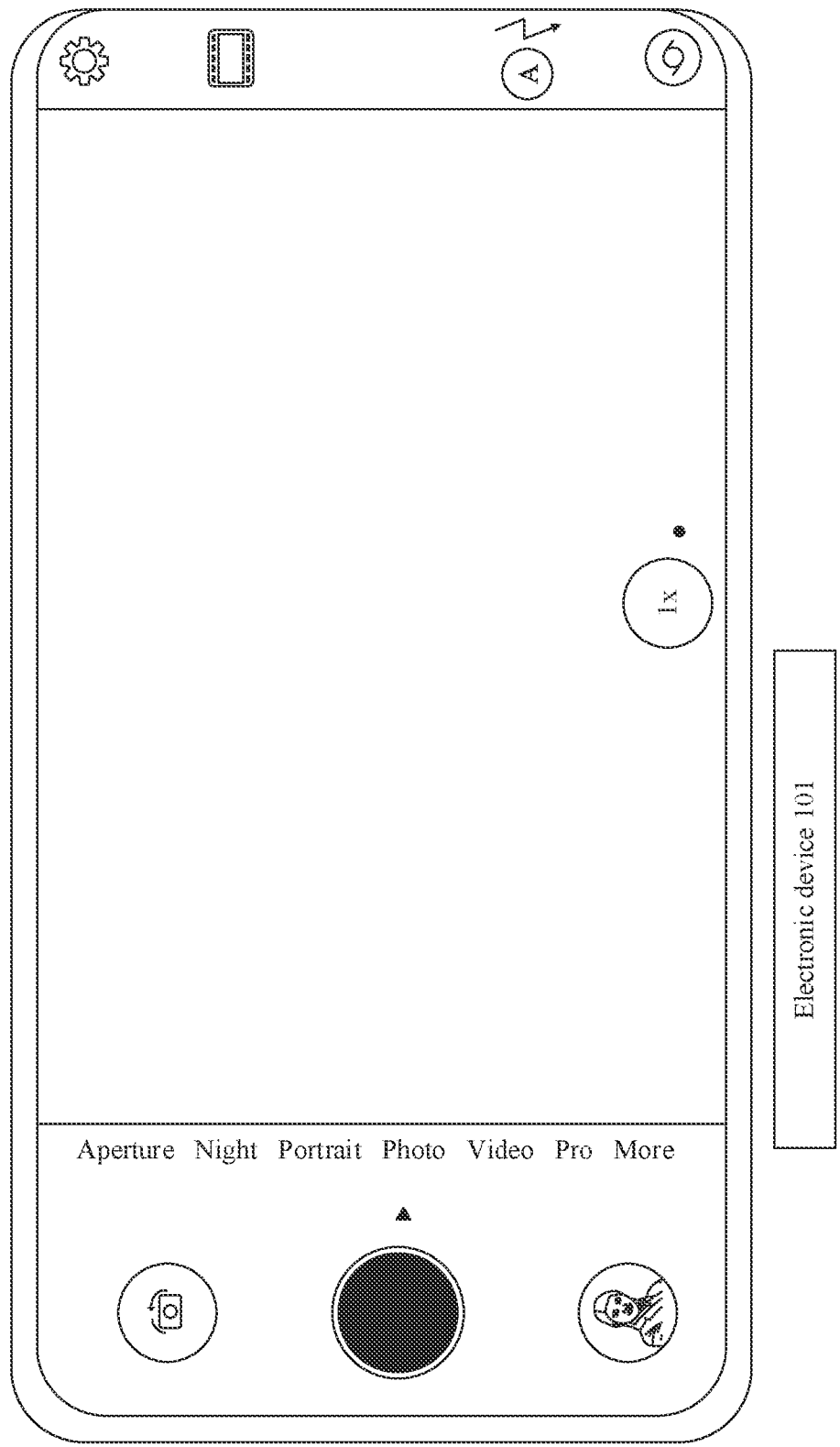

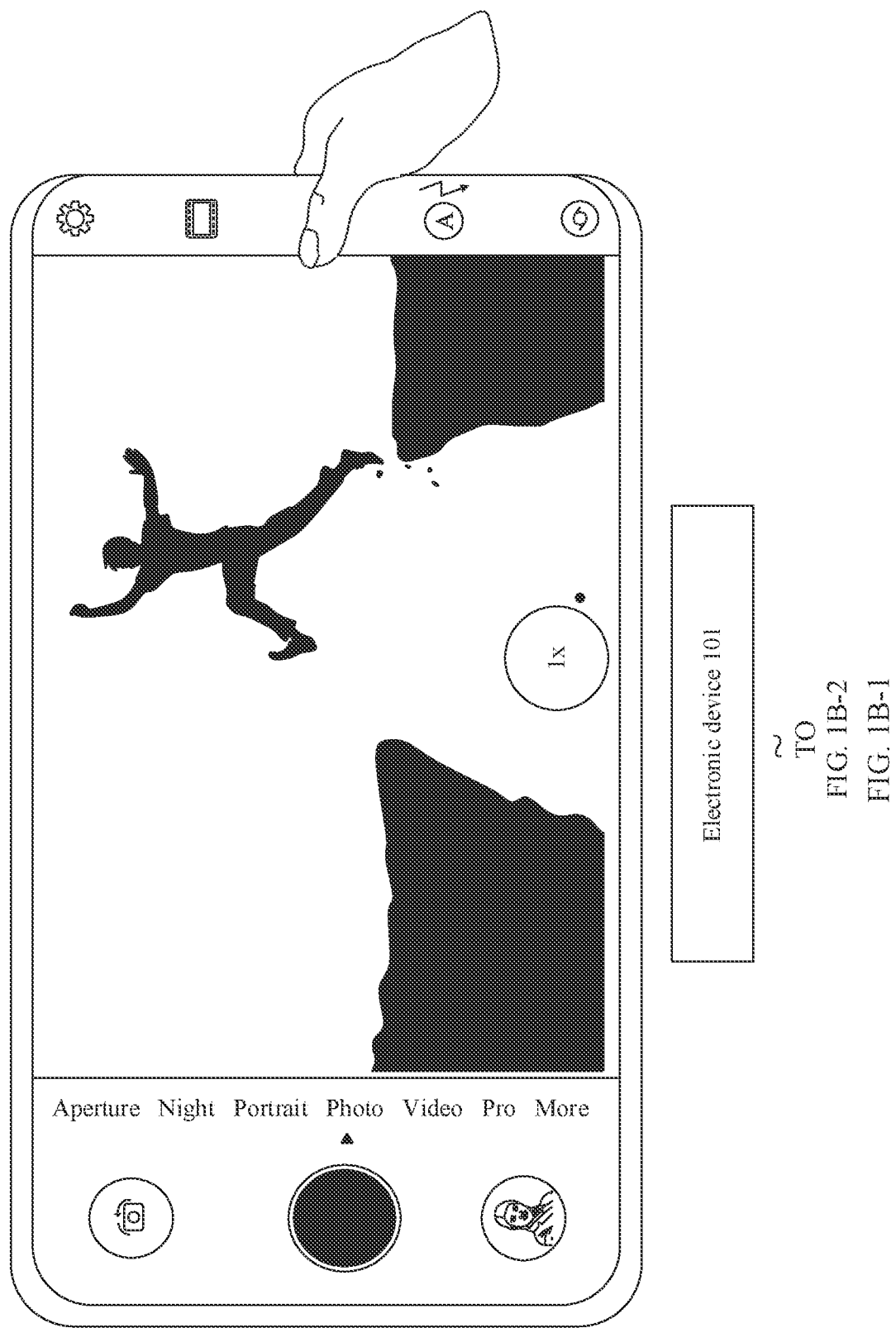

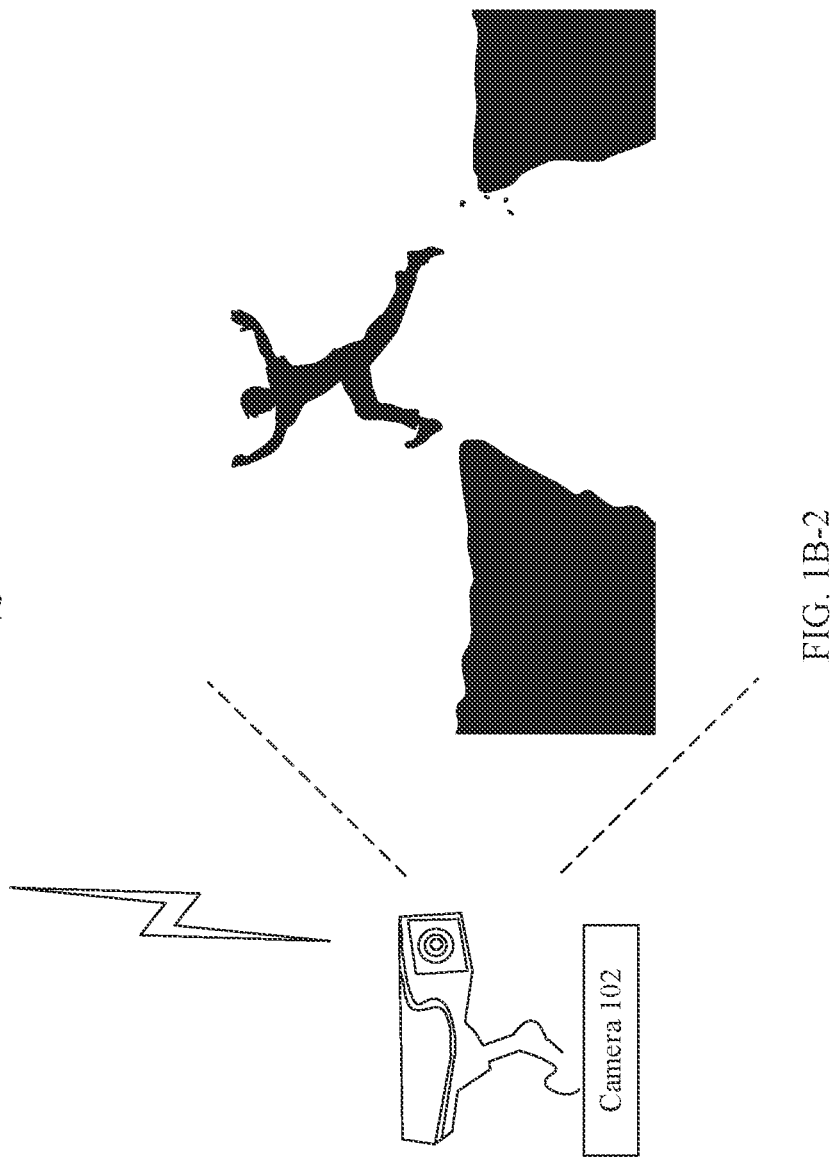

CONT.
FROM
FIG. 3D-1

S207
After obtaining an image frame $f_{11}$ through photographing, the electronic device stores the image frame $f_{11}$ in a $c_1$ storage bit, and sets $c_{last}=c_1$, where $Q_{last}$ represents a quality evaluation value corresponding to an image frame stored in a $c_{last}$ storage bit S208
After obtaining an image frame $f_{kh}$ through photographing, the electronic device calculates a quality evaluation value $Q_{fk,h}$ of the image frame $f_{kh}$ and a difference value $\square$ between the image frame $f_{kh}$ and a third image frame, where the difference value $\square$ is used to indicate a degree of difference between the image frame $f_{kh}$ and the third image frame, and the third image frame is an image frame stored in the $c_{last}$ storage bit S209
If the third image frame and the image frame $f_{kh}$ do not belong to a same group of image frames, $\square > \square_{thrd}$, and $Q_{fk,h} > Q_{thrd}$, update last to last + 1, and store the image frame $f_{kh}$ in the $c_{last}$ storage bit S210
If the third image frame and the image frame $f_{kh}$ belong to a same group of image frames, $\square > \square_{thrd}$, $Q_{fk,h} > Q_{thrd}$, and X>w, perform update, so that last = last + 1 and X = X − 1, and store the image frame $f_{kh}$ in the $c_{last}$ storage bit S211
If the third image frame and the image frame $f_{kh}$ belong to a same group of image frames, X=w, and $Q_{fk,h} > Q_{last}$, the electronic device overwrites the $c_{last}$ storage bit by uisng the image frame $f_{kh}$ and stores the image frame $f_{kh}$ into the $c_{last}$ storage bit

IMAGE FRAME STORAGE METHOD, PHOTOGRAPHING METHOD, AND ELECTRONIC DEVICE

CROSS-REFERENCE TO RELATED APPLICATIONS

This is a National Stage of International Patent Application No. PCT/CN2021/127749 filed on Oct. 30, 2021, which claims priority to Chinese Patent Application No. 202011199064.0 filed on Oct. 31, 2020, and Chinese Patent Application No. 202011574651.3 filed on Dec. 25, 2020. All of the aforementioned patent applications are hereby incorporated by reference in their entireties.

TECHNICAL FIELD

This application relates to the field of electronic technologies, and in particular, to an image frame storage method, a photographing method, and an electronic device.

BACKGROUND

With the development of camera technologies, a specification of a camera is increasingly high, image quality of a shot image is increasingly high, and storage space occupied by the image is also increasingly large. In some current scenarios, an electronic device needs to enable a camera in real time and store a shot image in real time. Consequently, storage space of the electronic device is fully occupied in a period of time. If the electronic device wants to continue to shoot and store an image, the electronic device needs to delete an image stored earlier in the electronic device. In this case, a user cannot view the image that is shot earlier.

SUMMARY

According to a first aspect, this application provides an image frame storage method, applied to an electronic device, where a maximum quantity of image frames that are allowed to be stored in first storage space of the electronic device is N, N is a positive integer, and the method includes: collecting a first image frame within first duration, where every m first image frames consecutively collected within the first duration are a group of image frames; and storing a second image frame that meets an image quality condition and that is in the first image frame into the first storage space, where the image quality condition includes: image quality of the second image frame is higher than first image quality, a difference value between image content of adjacent second image frames is greater than a first value, K is a positive integer, and when K is equal to 1, a quantity of second image frames that belong to a $K^{th}$ group of image frames is equal to 1, or when K is greater than or equal to 2, a quantity of second image frames that belong to a $K^{th}$ group of image frames is less than or equal to (K−1); or image quality of the second image frame is an image frame with highest image quality in a group in which the first image frame is located, where m is determined based on a total quantity F of image frames collected within the first duration and the maximum frame quantity N, the total quantity F is a quantity of image frames that can be collected by the electronic device within the first duration by using a first frame rate, and the total quantity F is greater than the maximum frame quantity N.

The electronic device may determine, based on an actual parameter configuration in a photographing process, a maximum storage capacity occupied by one image frame, and then calculate the maximum frame quantity N based on the maximum storage capacity occupied by one image frame and a size of the first storage space.

The first duration may be a preset duration value. For example, the first duration may be one second, one minute, one hour, or the like.

The first value is a preset value. The electronic device may calculate a difference value between two image frames based on a degree of difference between image content of the two image frames, and further determine whether the difference value is greater than the first value. The first image quality may be a preset image quality evaluation standard/values of parameters (such as resolution, color saturation, a color dynamic range, and a noise quantity) of an image frame. The electronic device may determine image quality of the image frame based on a preset dimension (such as the resolution, the color saturation, the dynamic range, and the noise quantity), to determine whether the image quality of the image frame is greater than the first image quality. The $K^{th}$ group of image frames is a group of image frames whose time sequence is in a $K^{th}$ sequential position within the first duration.

The electronic device collects the first image frame within the first duration based on the first frame rate.

It can be learned that the electronic device may store, in the first storage space, an image frame that meets the image quality condition within the first duration, and this helps prolong a time span of the stored image frame.

With reference to the first aspect, in a possible implementation, the storing a second image frame that meets image quality condition and that is in the first image frame into the first storage space specifically includes: storing an image frame $f_1$ into the first storage space when the image frame $f_1$ in each group of image frames is collected, where the image frame $f_1$ is an image frame that is first collected in each group of image frames.

With reference to the first aspect, in a possible implementation, a third image frame is an image frame that has been stored in the first storage space in each group of image frames and that belongs to a same group of image frames as an image frame $f_h$, and after the image frame $f_1$ in each group of image frames is collected, the method further includes: when the image frame $f_h$ in each group of image frames is collected, if image quality of the image frame $f_h$ is higher than that of the third image frame, overwriting the third image frame by using the image frame $f_h$ and storing the image frame $f_h$; or if image quality of the image frame $f_h$ is lower than that of the third image frame, not performing any operation, where the image frame $f_h$ is an image frame whose collection time sequence is in an $h^{th}$ sequential position in each group of image frames, and $2 \leq h \leq m$.

The overwriting and storing may refer to deleting the original third image frame, and storing the image frame $f_h$ into the first storage space.

It may be understood that, if the third image frame is overwritten by using the image frame $f_h$ and the image frame $f_h$ is stored, the third image frame corresponding to the group of image frames is updated to the image frame $f_h$. It can be learned that, according to the foregoing method, quality of the image frame may be compared with quality of a stored image frame in a same group of image frames each time an image frame is collected, so that an image frame with high image quality is stored in the first storage space, so that when all image frames in the group of image frames are collected, an image frame with highest image quality in the group of image frames is stored in the first storage space.

With reference to the first aspect, in a possible implementation, an image frame $f_{kh}$ represents an $h^{th}$ image frame in a $K^{th}$ group of image frames, K is a positive integer, h is a positive integer, and h≤m; the $K^{th}$ group of image frames refers to a group of image frames whose collection time sequence is in a $K^{th}$ sequential position within the first duration; the $h^{th}$ image frame refers to an image frame whose collection time sequence is in an $h^{th}$ sequential position in the $K^{th}$ group of image frames; Δ represents a difference value between the image frame $f_{kh}$ and a fourth image frame, the fourth image frame represents an image frame that is last stored in the first storage space within the first duration, a larger value of Δ indicates a larger difference between image content presented by the image frame $f_{kh}$ and image content presented by the fourth image frame, and $\Delta_{thrd}$ is the first value; $Q_{fkh}$ represents image quality of the image frame $f_{kh}$, $Q_{thrd}$ represents the first image quality, and $Q_{last}$ represents image quality of the fourth image frame; and an initial value of an integer value X is w, where w is an integer.

With reference to the first aspect, in a possible implementation, the storing a second image frame that meets image quality condition and that is in the first image frame into the first storage space specifically includes: storing an image frame $f_{11}$ into the first storage space when the image frame $f_{11}$ is collected.

With reference to the first aspect, in a possible implementation, after the image frame $f_{11}$ is collected, the method further includes: when the image frame $f_{kh}$ is collected, if the image frame $f_{kh}$ and the fourth image frame do not belong to a same group of image frames, $\Delta > \Delta_{thrd}$, and $Q_{fkh} > Q_{thrd}$, storing the image frame $f_{kh}$ into the first storage space.

It can be learned that, when the difference value between the image frame fib and the fourth image frame reaches the preset first value $\Delta_{thrd}$, and the image quality $Q_{fkh}$ of the image frame $f_{kh}$ is greater than the first image quality $Q_{thrd}$, the electronic device stores the image frame $f_{kh}$ into the first storage space. In addition to prolonging the time span of the stored image frame, this helps improve image quality of stored image framed and a degree of difference between the stored image frames, avoids repeatedly storing image frames with a small difference in image content or without a difference in image content, and effectively uses a storage capacity of the first storage space.

With reference to the first aspect, in a possible implementation, after the image frame $f_{11}$ is collected, the method further includes: when the image frame $f_{kh}$ is collected, if the image frame $f_{kh}$ and the fourth image frame do not belong to a same group of image frames, h=m, and $\Delta \leq \Delta_{thrd}$ or $Q_{fkh} \leq Q_{thrd}$, performing update, so that X=X+1.

With reference to the first aspect, in a possible implementation, after the image frame $f_{11}$ is collected, the method further includes: when the image frame $f_{kh}$ is collected, if the image frame $f_{kh}$ and the fourth image frame belong to a same group of image frames, $\Delta > \Delta_{thrd}$, $Q_{fkh} > Q_{thrd}$, and X>w, performing update, so that X=X−1, and storing the image frame $f_{kh}$ into the first storage space.

It may be understood that, when the image frame $f_{kh}$ is collected, in a case in which X>w, it indicates that a quantity of currently stored image frames is less than K, that is, before the $K^{th}$ group of image frames, at least one group of image frames does not store an image frame, and storage space that should be originally occupied by the at least one group of image frames is not occupied by another image frame. In the foregoing case, an image frame $f_{kh}$ whose difference value and image quality both meet the image quality condition is stored in the first storage space.

With reference to the first aspect, in a possible implementation, after the image frame $f_{11}$ is collected, the method further includes: when the image frame $f_{kh}$ is collected, if the image frame $f_{kh}$ and the fourth image frame belong to a same group of image frames, $\Delta \leq \Delta_{thrd}$, $Q_{fkh} > Q_{last}$, and X>w, overwriting the fourth image frame by using the image frame $f_{kh}$ and storing the image frame $f_{kh}$ into the first storage space.

It can be learned that, when a difference value between image frames is small, an image frame with highest image quality in the image frames is stored in the first storage space.

With reference to the first aspect, in a possible implementation, after the image frame $f_{11}$ is collected, the method further includes: when the image frame $f_{kh}$ is collected, if the image frame $f_{kh}$ and the fourth image frame belong to a same group of image frames, X=w, and $Q_{fkh} > Q_{last}$, overwriting the fourth image frame by using the image frame $f_{kh}$ and storing the image frame $f_{kh}$ into the first storage space.

It can be learned that, when X=w, the electronic device may compare image quality of image frames in a same group of image frames, and store an image frame with high image quality into the first storage space.

According to a second aspect, this application provides another photographing method, applied to a wireless communications system, where the wireless communications system includes a first electronic device and a second electronic device, the first electronic device is communicatively connected to the second electronic device, the first electronic device is provided with a camera, a maximum frame quantity of image frames that are allowed to be stored in first storage space of the first electronic device is N, N is a positive integer, and the method includes: collecting a first image frame within first duration, where every m first image frames consecutively collected within the first duration are a group of image frames; storing a second image frame that meets image quality condition and that is in the first image frame into the first storage space, where the image quality condition include: image quality of the second image frame is higher than first image quality, a difference value between image content of adjacent second image frames is greater than a first value, K is a positive integer, and when K is equal to 1, a quantity of second image frames that belong to a $K^{th}$ group of image frames is equal to 1, or when K is greater than or equal to 2, a quantity of second image frames that belong to a $K^{th}$ group of image frames is less than or equal to (K−1); or image quality of the second image frame is an image frame with highest image quality in a group in which the first image frame is located, where m is determined based on a total quantity F of image frames collected within the first duration and the maximum frame quantity N, the total quantity F is a quantity of image frames that can be collected by the first electronic device within the first duration by using a first frame rate, and the total quantity F is greater than the maximum frame quantity N; detecting, by the second electronic device, a first operation, and generating a photographing instruction in response to the first operation; sending, by the second electronic device, a first data packet to the first electronic device, where the first data packet includes the photographing instruction; receiving, by the first electronic device, the first data packet sent by the second electronic device; determining, by the first electronic device according to the photographing instruction, Z second image frames from the second image frame stored in the first storage space, where Z is a positive integer; sending, by the first electronic device, the Z second image frames to the second electronic device; receiving, by the second electronic device, the Z second image frames; and displaying and/or storing, by the second electronic device, the Z second image frames.

The first operation may be a voice operation, a touch operation, or a gesture operation.

With reference to the second aspect, in a possible implementation, the storing a second image frame that meets image quality condition and that is in the first image frame into the first storage space specifically includes: storing an image frame $f_1$ into the first storage space when the image frame $f_1$ in each group of image frames is collected, where the image frame $f_1$ is an image frame that is first collected in each group of image frames.

With reference to the second aspect, in a possible implementation, a third image frame is an image frame that has been stored in the first storage space in each group of image frames and that belongs to a same group of image frames as an image frame $f_h$, and after the image frame $f_1$ in each group of image frames is collected, the method further includes: when the image frame $f_h$ in each group of image frames is collected, if image quality of the image frame $f_h$ is higher than that of the third image frame, overwriting the third image frame by using the image frame $f_h$ and storing the image frame $f_h$; or if image quality of the image frame $f_h$ is lower than that of the third image frame, not performing any operation, where the image frame $f_h$ is an image frame whose collection time sequence is in an $h^{th}$ sequential position in each group of image frames, and $2 \leq h \leq m$.

With reference to the second aspect, in a possible implementation, an image frame $f_{kh}$ represents an $h^{th}$ image frame in a $K^{th}$ group of image frames, K is a positive integer, h is a positive integer, and $h \leq m$; the $K^{th}$ group of image frames refers to a group of image frames whose collection time sequence is in a $K^{th}$ sequential position within the first duration; the $h^{th}$ image frame refers to an image frame whose collection time sequence is in an $h^{th}$ sequential position in the $K^{th}$ group of image frames; $\Delta$ represents a difference value between the image frame $f_{kh}$ and a fourth image frame, the fourth image frame represents an image frame that is last stored in the first storage space within the first duration, a larger value of $\Delta$ indicates a larger difference between image content presented by the image frame $f_{kh}$ and image content presented by the fourth image frame, and $\Delta_{thrd}$ is the first value; $Q_{fkh}$ represents image quality of the image frame $f_{kh}$, $Q_{thrd}$ represents the first image quality, and $Q_{last}$ represents image quality of the fourth image frame; and an initial value of an integer value X is w, where w is an integer.

With reference to the second aspect, in a possible implementation, the storing a second image frame that meets image quality condition and that is in the first image frame into the first storage space specifically includes: storing an image frame $f_{11}$ into the first storage space when the image frame $f_{11}$ is collected.

With reference to the second aspect, in a possible implementation, after the image frame $f_{11}$ is collected, the method further includes: when the image frame $f_{kh}$ is collected, if the image frame $f_{kh}$ and the fourth image frame do not belong to a same group of image frames, $\Delta > \Delta_{thrd}$, and $Q_{fkh} > Q_{thrd}$, storing the image frame $f_{kh}$ into the first storage space.

With reference to the second aspect, in a possible implementation, after the image frame $f_{11}$ is collected, the method further includes: when the image frame $f_{kh}$ is collected, if the image frame $f_{kh}$ and the fourth image frame do not belong to a same group of image frames, h=m, and $\Delta \leq \Delta_{thrd}$ or $Q_{fkh} \leq Q_{thrd}$, performing update, so that X=X+1.

With reference to the second aspect, in a possible implementation, after the image frame $f_{11}$ is collected, the method further includes: when the image frame $f_{kh}$ is collected, if the image frame $f_{kh}$ and the fourth image frame belong to a same group of image frames, $\Delta > \Delta_{thrd}$, $Q_{fkh} > Q_{thrd}$, and X>w, performing update, so that X=X-1, and storing the image frame $f_{kh}$ into the first storage space.

With reference to the second aspect, in a possible implementation, after the image frame $f_{11}$ is collected, the method further includes: when the image frame $f_{kh}$ is collected, if the image frame $f_{kh}$ and the fourth image frame belong to a same group of image frames, $\Delta \leq \Delta_{thrd}$, $Q_{fkh} > Q_{last}$, and X>w, overwriting the fourth image frame by using the image frame $f_{kh}$ and storing the image frame $f_{kh}$ into the first storage space.

With reference to the second aspect, in a possible implementation, after the image frame $f_{11}$ is collected, the method further includes: when the image frame $f_{kh}$ is collected, if the image frame $f_{kh}$ and the fourth image frame belong to a same group of image frames. X=w, and $Q_{fkh} > Q_{last}$, overwriting the fourth image frame by using the image frame $f_{kh}$ and storing the image frame $f_{kh}$ into the first storage space.

With reference to the second aspect, in a possible implementation, the method further includes: performing, by the first electronic device, image processing on the first image frame collected within the first duration to obtain a fifth image frame, where a storage capacity occupied by the fifth image frame is less than a storage capacity occupied by the first image frame, and at least one parameter of the fifth image frame is less than that of the first image frame.

The at least one parameter may include one or more of the following: resolution, color saturation, an image dynamic range, and the like. Optionally, a noise quantity in the fifth image frame is greater than that in the first image frame.

It can be learned that the first electronic device may send the fifth image frame that occupies a low storage capacity to the second electronic device for preview. This reduces a data transmission amount and reduces power consumption of the first electronic device and the second electronic device.

With reference to the second aspect, in a possible implementation, before the detecting, by the second electronic device, a first operation, the method further includes: sending, by the first electronic device, the fifth image frame to the second electronic device; and displaying, by the second electronic device, an image based on the received fifth image frame.

With reference to the second aspect, in a possible implementation, the photographing instruction includes a first time point, and the Z second image frames are Z image frames that are in image frames stored in the first electronic device and whose collection time points are closest to the first time point.

The first time point is obtained by the second electronic device through calculation based on a first delay, where the first delay includes a second delay and/or a third delay; the second delay refers to a data transmission delay between the second electronic device and the first electronic device; and the third delay refers to a delay between a second time point and a third time point, the second time point refers to a time point at which the first operation is initiated, and the third time point refers to a time point at which the second electronic device detects the first operation. The first time point is equal to the third time point minus the second delay and the third delay. Optionally, in embodiments of this application, the third delay may not be considered in an actual scenario. In this case, the first time point is equal to the second time point minus the second delay. In this case, the second time point is both a time point at which the first operation is initiated and a time point at which the first operation is detected.

With reference to the second aspect, in a possible implementation, the photographing instruction includes a first delay, where the first delay includes a second delay and/or a third delay; the second delay refers to a data transmission delay between the second electronic device and the first electronic device; and the third delay refers to a delay between a second time point and a third time point, the second time point refers to a time point at which the first operation is initiated, and the third time point refers to a time point at which the second electronic device detects the first operation.

The third delay may be preset based on data statistics. For example, if the first operation is a touch operation, and the first operation is performed by a user, it may be determined, based on the data statistics, that time at which the user initiates the touch operation to time at which the electronic device detects the touch operation of the user is about 0.3 seconds. In this case, the third delay may be set to 0.3 seconds.

With reference to the second aspect, in a possible implementation, the first duration T is greater than or equal to $2 \times T_2$, or $T \geq 2 \times T_2 + T_3$, where $T_2$ indicates the second delay, and $T_3$ indicates the third delay.

It can be learned that the electronic device may associate the first duration with the second delay and the third delay, to determine the first duration.

According to a third aspect, this application provides another photographing method, applied to a second electronic device, where the method includes: detecting a first operation, and generating a photographing instruction in response to the first operation; sending a first data packet to a first electronic device, where the first data packet includes the photographing instruction; receiving Z second image frames sent by the first electronic device, where the Z second image frames are determined by the first electronic device according to the photographing instruction, and Z is a positive integer; and displaying and/or storing the Z second image frames, where a time point at which the second electronic device detects the first operation is a third time point, the Z second image frames include a sixth image frame, data of the sixth image frame includes a first timestamp, and the first timestamp includes a first time point; duration between the first time point and the third time point is greater than or equal to a first delay, and the first delay is equal to a second delay, or the first delay is equal to a sum of a second delay and a third delay; the second delay refers to a data transmission delay between the first electronic device and the second electronic device; and the third delay refers to a delay between a second time point and the third time point, and the second time point refers to a time point at which the first operation is initiated.

The image frame storage method used by the first electronic device is the image frame storage method provided in the first aspect. It can be learned that, according to the foregoing method, the Z second image frames received by the second electronic device include the sixth image frame, and duration between the first time point and the third time point of the sixth image frame is greater than or equal to the first delay. It can be learned that a time span of an image frame stored in the first electronic device is large, and may be greater than or equal to the first delay.

According to a fourth aspect, an electronic device includes one or more processors and a memory. The memory is coupled to the one or more processors, the memory is configured to store computer program code, the computer program code includes computer instructions, and the one or more processors invoke the computer instructions to enable the electronic device to perform the first aspect and any possible implementation of the first aspect, or the second aspect and any possible implementation of the second aspect, or the third aspect and any possible implementation of the third aspect.

According to a fifth aspect, this application provides a computer program product. When the computer program product runs on an electronic device, the electronic device is enabled to perform the first aspect and any possible implementation of the first aspect, or the second aspect and any possible implementation of the second aspect, or the third aspect and any possible implementation of the third aspect.

According to a sixth aspect, this application provides a computer-readable storage medium, where the computer-readable storage medium includes computer instructions, and when the computer instructions are run on an electronic device, the electronic device is enabled to perform the first aspect and any possible implementation of the first aspect, or the second aspect and any possible implementation of the second aspect, or the third aspect and any possible implementation of the third aspect.

BRIEF DESCRIPTION OF DRAWINGS

To describe technical solutions in embodiments of this application more clearly, the following describes the accompanying drawings used in embodiments of this application.

FIG. 1A-1 and FIG. 1A-2, and FIG. 1B-1 and FIG. 1B-2 are schematic diagrams of a group of photographing scenarios according to an embodiment of this application:

FIG. 2 is a schematic diagram of a hardware structure of an electronic device according to an embodiment of this application;

FIG. 3D-1 and FIG. 3D-2 are a schematic flowchart of another image frame storage method according to an embodiment of this application;

DESCRIPTION OF EMBODIMENTS

Terms used in following embodiments of this application are merely intended to describe specific embodiments, but are not intended to limit this application. Terms "one", "a", "the", "the foregoing", "this", and "the one" of singular forms used in this specification and the appended claims of this application are also intended to include plural forms, unless otherwise specified in the context clearly. It should be further understood that a term "and/or" used in this application indicates and includes any one or all of possible combinations of one or more listed items.

The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of embodiments of this application, unless otherwise specified, "a plurality of" means two or more than two.

The following describes an application scenario to which embodiments of this application are applicable.

Figures 1, 1A, 2:
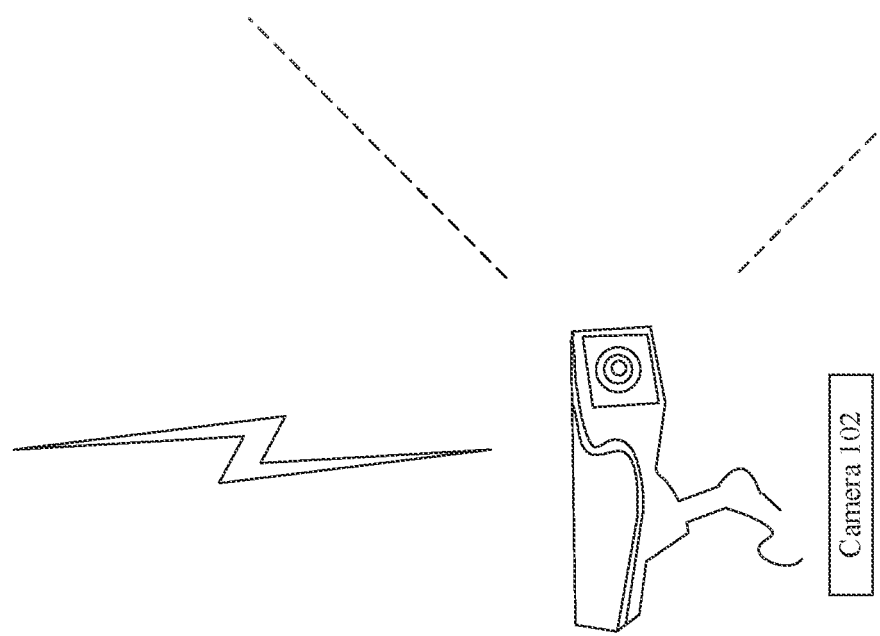
Figure 2:
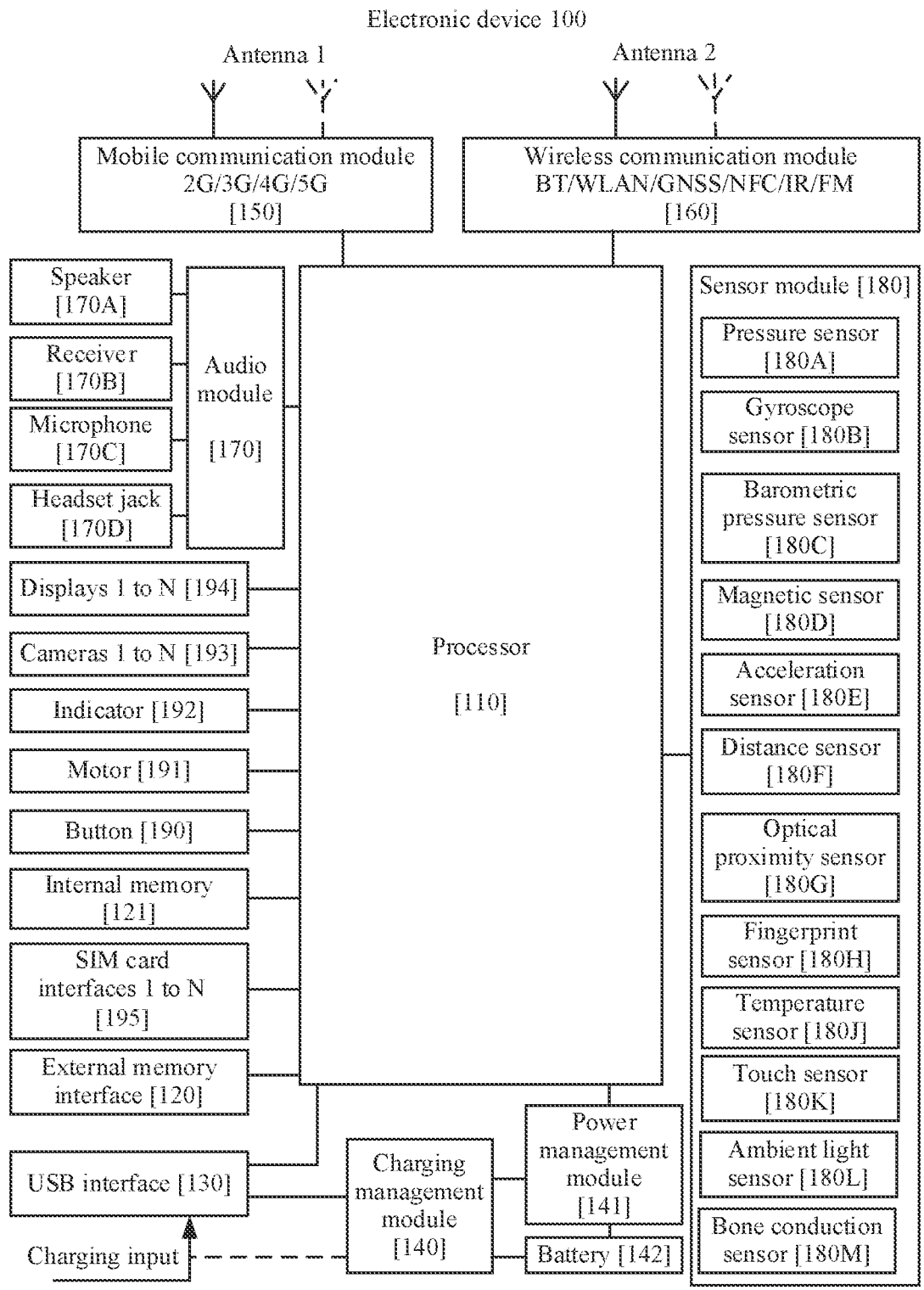

FIG. 1A-1 and FIG. 1A-2 are a schematic diagram of a photographing scenario according to an embodiment of this application. FIG. 1A-1 and FIG. 1A-2 include an electronic device 101 and a camera 102. The electronic device 101 is a communicatively connected to the camera 102. After obtaining a first image frame through photographing, the camera 102 may process the first image frame to obtain a fifth image frame, and send the fifth image frame to the electronic device 101. The electronic device 101 may display, on a display based on the fifth image frame, an image shot by the camera 102.

In this embodiment of this application, a storage capacity occupied by the fifth image frame is less than a storage capacity occupied by the first image frame, at least one parameter of the fifth image frame is less than that of the first image frame, and the at least one parameter may be one or more of the following: resolution, color saturation, and an image dynamic range. Optionally, a noise quantity in the fifth image frame is greater than that in the first image frame.

In some embodiments, when a user views, on the electronic device 101, an image that needs to be shot, the user may tap a photographing button on the electronic device 101, to locally store a corresponding image frame. The camera 102 transmits, in real time, the fifth image frame obtained after image processing to the electronic device 101. Because the at least one parameter of the fifth image frame is lower than that of the first image frame, image quality presented by the fifth image frame is lower than image quality presented by the first image frame. Therefore, after the user taps the photographing button, the electronic device 101 needs to send a photographing instruction to the camera 102, and the camera 102 sends a second image frame to the electronic device 101 according to the photographing instruction, so that the electronic device 101 stores the second image frame, and finally the image frame stored in the electronic device 101 is an image frame with high image quality. The second image frame is a first image frame that is selected and stored by the camera 102 from the collected first image frame and that meets image quality condition. However, because there is a communication delay between the electronic device 101 and the camera 102, and there is also a specific time difference between time at which the user sees an image to be stored and time at which the user taps the photographing button, the camera 102 needs to store and reserve a specific quantity of image frames in advance. For example, for a communication delay, refer to FIG. 1B-1 and FIG. 1B-2. It can be learned from FIG. 1B-1 and FIG. 1B-2 that, an image displayed by the electronic device 101 is not synchronous with an image shot by the camera 102, and the image displayed by the electronic device 101 lags behind the image shot by the camera 102.

In some embodiments, a main function of the camera 102 is to shoot a high-definition image, and a storage space configuration of the camera 102 is small. In addition, a frame rate of the camera 102 is high (for example, 60 image frames are shot per second) in a photographing process. If each image frame is stored in the storage space, the storage space of the camera 102 is quickly fully occupied. As a result, when receiving the photographing instruction of the electronic device 101, the camera 102 may have deleted, because the storage space is full, the image frame that meets the condition, and cannot send the image frame that meets the condition to the electronic device 101. To resolve the foregoing problem, the camera 102 may store one image frame every several image frames. However, the image frame stored every several image frames may be an image frame with poor image quality, or may be an image frame that is repeated in some scene pictures. As a result, the storage space cannot be effectively used.

Embodiments of this application provide an image frame storage method, to effectively improve quality of an image frame stored by the camera 102. In addition, in some embodiments, the camera 102 may reduce a storage frequency of the image frame when a scene picture changes slightly, and increase the storage frequency of the image frame when the scene picture changes greatly, so that image frames finally stored in the camera 102 are image frames with a large difference value. It can be learned that according to the method provided in this embodiment of this application, when the storage space of the camera 102 is small, quality of an image stored in the storage space can be improved, and a probability of repeatedly storing an image frame of a same scene picture can be reduced.

The following describes an electronic device provided in embodiments of this application.

The electronic device may be a mobile phone, a tablet computer, a wearable device, a vehicle-mounted device, an augmented reality (augmented reality, AR)/virtual reality (virtual reality, VR) device, a notebook computer, an ultra-mobile personal computer (ultra-mobile personal computer, UMPC), a netbook, a personal digital assistant (personal digital assistant, PDA), or a dedicated camera (for example, a single-lens reflex camera or a card camera). A specific type of the electronic device is not limited in this application.

FIG. 2 shows an example of a structure of the electronic device 100. It should be noted that, in different cases, the electronic device 100 may specifically refer to the electronic device 101 described in FIG. 1A-1 or the camera 102 described in FIG. 1A-2. As shown in FIG. 2, the electronic device 100 may have at least one camera 193, for example, a front-facing camera, a wide-angle camera, an ultra-wide-angle camera, or a telephoto camera. In addition, the electronic device 100 may further include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a display 194, a subscriber identification module (subscriber identification module, SIM) card interface 195, and the like.

The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application does not constitute a specific limitation on the electronic device 100. In some other embodiments of this application, the electronic device 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent components, or may be integrated into one or more processors.

In some embodiments, the processor 110 such as the controller or the GPU may be configured to: in a photographing scenario, generate a second image frame based on data collected by the at least one camera 193, process the second image frame, and send a fifth image frame obtained after image processing to another electronic device that is communicatively connected to the electronic device 100, to reduce a data transmission amount, so that a user can view, on the another electronic device in real time, an image shot by the electronic device 100.

In some other embodiments, the processor 110 such as the controller or the GPU may be further configured to evaluate image quality of the image frame, to determine the image quality.

In some other embodiments, the processor 110 such as the controller or the GPU may be further configured to compare a difference between any two image frames, to determine a difference value between the two image frames. The electronic device 100 may determine the difference between the two image frames based on the difference value.

The controller may be a nerve center and a command center of the electronic device 100. The controller may generate an operation control signal based on an instruction operation code and a time sequence signal, to complete control of instruction reading and instruction execution.

A memory may be further disposed in the processor 110, and is configured to store instructions and data. In some embodiments, the memory in the processor 110 is a cache. The memory may store instructions or data that has been used or cyclically used by the processor 110. If the processor 110 needs to use the instructions or the data again, the processor 110 may directly invoke the instructions or the data from the memory. This avoids repeated access, reduces waiting time of the processor 110, and improves system efficiency. In a photographing scenario, the electronic device 100 is a photographing device, and an image frame obtained by photographing by the electronic device 100 is stored in a cache, so that when the electronic device 100 receives a photographing instruction of a second electronic device that is communicatively connected to the electronic device 100, the electronic device 100 may quickly read the image frame from the cache, and send the image frame to the second electronic device.

A wireless communication function of the electronic device 100 may be implemented through the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communications frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a wireless communication solution that includes 2G/3G/4G/5G or the like and that is applied to the electronic device 100. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1.

The wireless communication module 160 may provide a wireless communication solution that is applied to the electronic device 100 and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communication module 160 may be one or more components integrating at least one communications processor module. The wireless communication module 160 receives an electromagnetic wave by the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, in the electronic device 100, the antenna 1 and the mobile communication module 150 are coupled, and the antenna 2 and the wireless communication module 160 are coupled, so that the electronic device 100 can communicate with a network and another device by using a wireless communications technology. The wireless communication technology may include a global system for mobile communications (global system for mobile communications, GSM), a general packet radio service (general packet radio service. GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system. BDS), a quasi-zenith satellite system (quasi-zenith satellite system, QZSS), and/or a satellite based augmentation system (satellite based augmentation system, SBAS).

The internal memory 121 may include one or more random access memories (random access memory, RAM) and one or more non-volatile memories (non-volatile memory, NVM).

The random access memory may include a static random access memory (static random access memory. SRAM), a dynamic random access memory (dynamic random access memory, DRAM), a synchronous dynamic random access memory (synchronous dynamic random access memory, SDRAM), a double data rate synchronous dynamic random access memory (double data rate synchronous dynamic random access memory, DDR SDRAM, for example, a fifth generation DDR SDRAM is generally referred to as a DDR5 SDRAM), and the like.

The non-volatile memory may include a magnetic disk storage device and a flash memory (flash memory).

The flash memory may be classified into an NOR flash, an NAND flash, a 3D NAND flash, and the like according to an operation principle; may be classified into a single-level cell (single-level cell, SLC), a multi-level cell (multi-level cell, MLC), a triple-level cell (triple-level cell, TLC), a quad-level cell (quad-level cell, QLC), and the like based on a quantity of electric potential levels of a cell; or may be classified into a universal flash storage (English: universal flash storage, UFS), an embedded multimedia card (embedded multimedia Card, eMMC), and the like according to storage specifications.

The random access memory may be directly read and written by the processor 110. The random access memory may be configured to store an operating system or an executable program (for example, machine instructions) of another running program, and may be further configured to store data of the user and an application program, and the like.

The nonvolatile memory may also store an executable program, data of a user, data of an application, and the like, which may be loaded into the random access memory in advance for directly reading and writing by the processor 110.

The external memory interface 120 may be configured to connect to an external non-volatile memory, to extend a storage capability of the electronic device 100. The external nonvolatile memory communicates with the processor 110 through the external memory interface 120, to implement a data storage function. For example, files such as music and videos are stored in the external non-volatile memory.

In some embodiments, the internal memory 121 may be configured to store an image frame, and the electronic device 100 may mark a plurality of storage bits in the internal memory 121, to determine a maximum frame storage volume based on the storage bits, so that the electronic device 100 properly configures a storage policy, and stores an image frame that meets a condition, thereby meeting requirements of the user for viewing and browsing an image in different scenarios.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. Capacitance between electrodes changes when a force is applied to the pressure sensor 180A. The electronic device 100 determines pressure intensity based on the change of the capacitance. When a touch operation is performed on the display 194, the electronic device 100 detects intensity of the touch operation by using the pressure sensor 180A. The electronic device 100 may also calculate a touch location based on a detection signal of the pressure sensor 180A.

The ambient light sensor 180L is configured to sense ambient light brightness. The electronic device 100 may adaptively adjust luminance of the display 194 based on the sensed ambient light luminance. The ambient light sensor 180L may also be configured to automatically adjust white balance during photographing. The ambient light sensor 180L may also cooperate with the optical proximity sensor 180G to detect whether the electronic device 100 is in a pocket to prevent an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The touch sensor 180K is also referred to as a touch panel. The touch sensor 180K may be disposed on the display 194, and the touch sensor 180K and the display 194 constitute a touchscreen, which is also referred to as a "touch screen". The touch sensor 180K is configured to detect a touch operation performed on or near the touch sensor 180K. The touch sensor may transfer the detected touch operation to the application processor to determine a type of the touch event. Visual output related to the touch operation may be provided by using the display 194. In some other embodiments, the touch sensor 180K may alternatively be disposed on a surface of the electronic device 100, or disposed in a position different from the display 194.

The button 190 includes a power button, a volume button, and the like. The button 190 may be a mechanical button, or may be a touch button. The electronic device 100 may receive a key input, and generate a key signal input related to a user setting and function control of the electronic device 100.

The electronic device 100 may implement a photographing function through the camera 193, the ISP, the video codec, the GPU, the display 194, the application processor and the like.

The ISP may be configured to process data fed back by the camera 193. For example, during photographing, a shutter is pressed, light is transferred to a camera photosensitive element through a lens, an optical signal is converted into an electrical signal, and the camera photosensitive element transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. Not limited to being integrated into the processor 110, the ISP may also be disposed in the camera 193.

In this embodiment of this application, after the camera 193 transmits the electrical signal to the ISP for processing, the ISP performs optimization processing to generate an image frame.

In some embodiments, the electronic device 100 may specifically refer to the camera 102 in FIG. 1A-2. The ISP may add a timestamp to the image frame, so that the electronic device 100 sends a fifth image frame obtained after image processing to the electronic device 101. After the electronic device 101 returns a photographing instruction including the timestamp to the electronic device 100, the electronic device 100 may determine at least one second image frame based on the timestamp, and then the electronic device 100 may send the at least one second image frame to the electronic device 101.

The camera 193 includes a lens and a photosensitive element (which may also be referred to as an image sensor), and is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts the optical signal into an electrical signal, and then transfers the electrical signal to the ISP to convert the electrical signal into a digital image signal, for example, an image signal in a standard RGB or YUV format, and finally stores or sends the digital image signal in a form of an image frame.

Hardware configurations and physical locations of the cameras 193 may be different. Therefore, sizes, ranges, content, definition, or the like of images collected by the cameras may be different.

Image output sizes of the cameras 193 may be different, or may be the same. An image output size of a camera refers to a length and a width of an image captured by the camera. Both the length and the width of the image may be measured by using a quantity of pixels. The image output size of the camera may also be referred to as an image size, an image dimension, a pixel size, or image resolution. A common image output ratio of a camera may include 4:3, 16:9, 3:2, or the like. An image output size ratio refers to an approximate ratio of a quantity of pixels in a length to a quantity of pixels in a width of an image captured by a camera.

The camera 193 may correspond to a same focal length, or may correspond to different focal lengths. The focal length may include but is not limited to: a first focal length less than a preset value 1 (for example, 20 mm), a second focal length greater than or equal to the preset value 1 and less than or equal to a preset value 2 (for example, 50 mm), and a third focal length greater than the preset value 2. A camera corresponding to the first focal length may be referred to as an ultra-wide-angle camera, a camera corresponding to the second focal length may be referred to as a wide-angle camera, and a camera corresponding to the third focal length may be referred to as a long-focus camera. A larger focal length corresponding to a camera indicates a smaller field of view (field of view, FOV) of the camera. The field of view refers to an angle range in which an optical system can perform imaging.

The camera 193 may be disposed on two sides of the electronic device. A camera that is located on a same plane as the display 194 of the electronic device may be referred to as a front-facing camera, and a camera that is located on a plane on which a rear cover of the electronic device is located may be referred to as a rear-facing camera. The front-facing camera may be configured to capture an image of a photographer facing the display 194, and the rear-facing camera may be configured to capture an image of a photographed object (such as a person or a scenery) facing the photographer.

In some embodiments, the camera 193 may be configured to collect depth data. For example, the camera 193 may have a time of flight (TOF) 3D sensing module or a structured light (structured light) 3D sensing module, configured to obtain depth information. The camera configured to collect depth data may be the front-facing camera, or may be the rear-facing camera.

The video codec is configured to compress or decompress a digital image. The electronic device 100 may support one or more image codecs. In this way, the electronic device 100 may open or store pictures or videos in a plurality of encoding formats.

The electronic device 100 may implement a display function by using the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flexible light-emitting diode, FLED), a mini-LED, a micro-LED, a micro-OLED, a quantum dot light-emitting diode (quantum dot light-emitting diode, QLED), and the like. In some embodiments, the electronic device 100 may include one or more displays 194.

In some embodiments, the electronic device may store one image frame at an interval of a period of time or at an interval of a specific quantity of frames, to prolong a time span corresponding to all image frames stored in the electronic device. For example, if the electronic device stores, in the electronic device, each shot image frame, the electronic device fully stores the local storage medium within one day, that is, the time span corresponding to all the image frames stored in the electronic device is one day. If the electronic device stores one image frame at an interval of one image frame, the electronic device fully stores the local storage medium within two days, that is, the time span corresponding to all the image frames stored in the electronic device is two days. When the electronic device uses a policy of storing one image frame at an interval of specific duration or a specific quantity of frames, because quality of an image frame shot by the electronic device at some time points is poor, and quality of an image frame shot at some time points is good, the electronic device may store a poor-quality image frame in the electronic device, but does not store a good-quality image frame in the electronic device. Consequently, quality of an image finally presented to the user for viewing and browsing is poor, causing poor user experience.

Figure 3A:
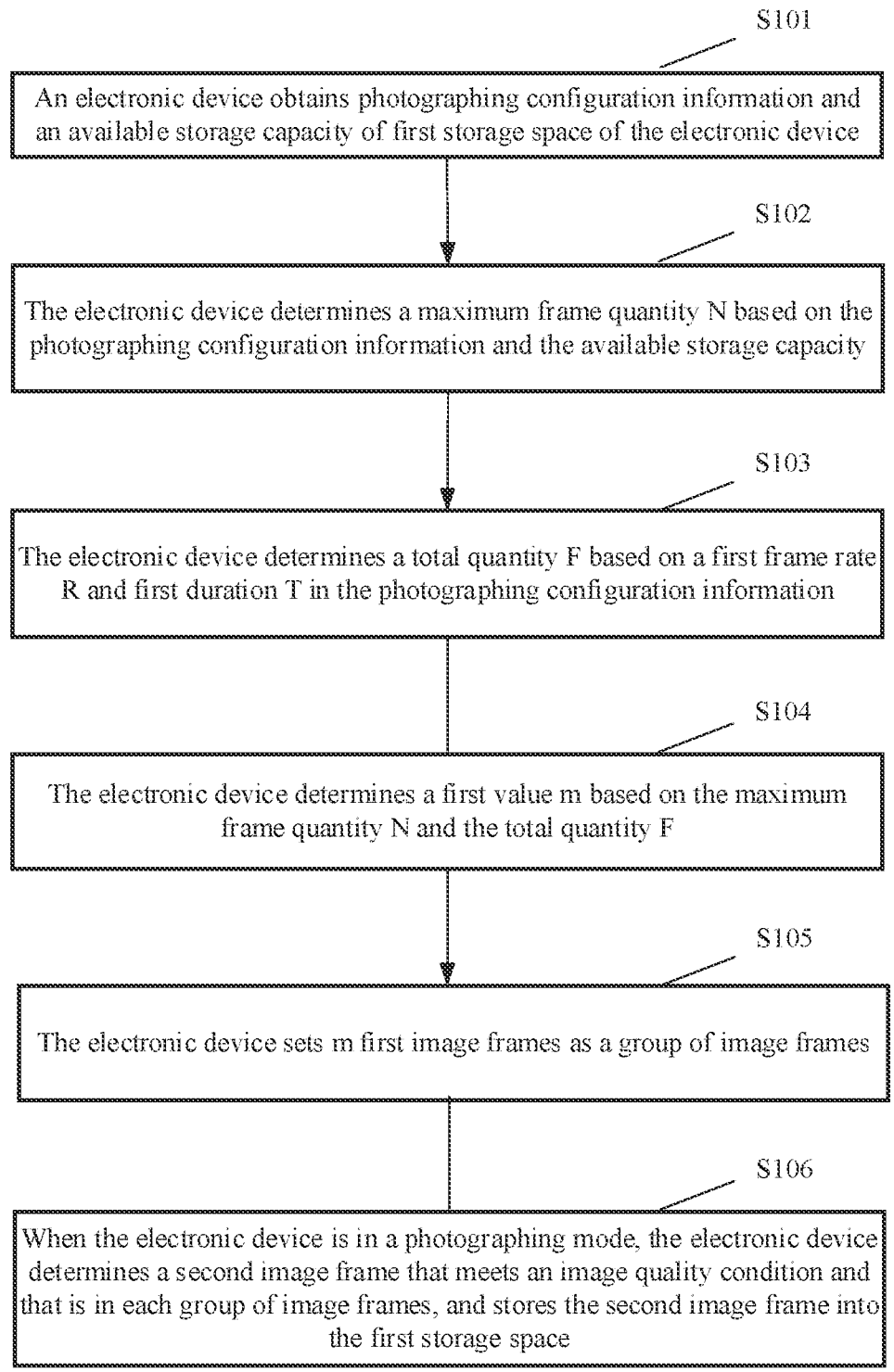
FIG. 3A is a schematic flowchart of an image frame storage method according to an embodiment of this application.

The following embodiment describes an image frame storage method provided in an embodiment of this application. As shown in FIG. 3A, the method may include the following steps.

S101: An electronic device obtains photographing configuration information and an available storage capacity of first storage space of the electronic device.

The photographing configuration information may include the following information; resolution, a format, and a photographing frame rate of an image.

The first storage space of the electronic device may be a cache, an internal memory, or an external memory. Specifically, the available storage capacity in this embodiment of this application may represent a capacity that can be used m any one of the foregoing storage media in a specific application scenario. For example, the available storage capacity may represent a capacity that can be used in the cache of the electronic device.

S102: The electronic device determines a maximum frame quantity N based on the photographing configuration information and the available storage capacity.

The electronic device may calculate, based on the resolution and the format of the image in the photographing configuration information, an estimated value of a storage capacity occupied by one image frame. Specifically, the estimated value may be equal to a value of a maximum storage capacity occupied by one image frame. For example, if the electronic device occupies a maximum capacity of 10 MB in a current configuration condition, the electronic device may set the estimated value to 10 MB. Then, the electronic device determines, based on the estimated value and the available storage capacity, the maximum frame quantity N that is allowed to be stored in the first storage space. Specifically, the maximum frame quantity is equal to the available storage capacity divided by the estimated value.

S103: The electronic device determines a total quantity F based on a first frame rate R and first duration T in the photographing configuration information.

The first frame rate R may be a preset frame rate of a collected image frame.

The first duration T may be set by a user on the electronic device. For example, the user may set the first duration to one day, that is, when viewing an image on the electronic device, the user expects to view an image shot by the electronic device within one day. Therefore, when storing the image frame, the electronic device stores the image frame that is within one day of duration before a current time point.

Specifically, the total quantity F represents a total quantity of image frames that are collected and generated by the electronic device by using the first frame rate within the first duration. Specifically, the total quantity F is equal to a product of the first frame rate R and the first duration T, where F=T×R. For example, when the electronic device enables a photographing mode, if the first frame rate R of the electronic device is 30 (Frames Per Second, Fps), that is, a quantity of image frames collected and generated by the electronic device per second is 30, and the current first duration T is 10 seconds, F=T×R=10×30=300.

S104: The electronic device determines a first value m based on the maximum frame quantity N and the total quantity F.

Specifically, a specific calculation formula of the first value m may be: m=F/N, where m is an integer greater than or equal to 2.

S105: The electronic device sets m first image frames as a group of image frames.

Figure 3B:
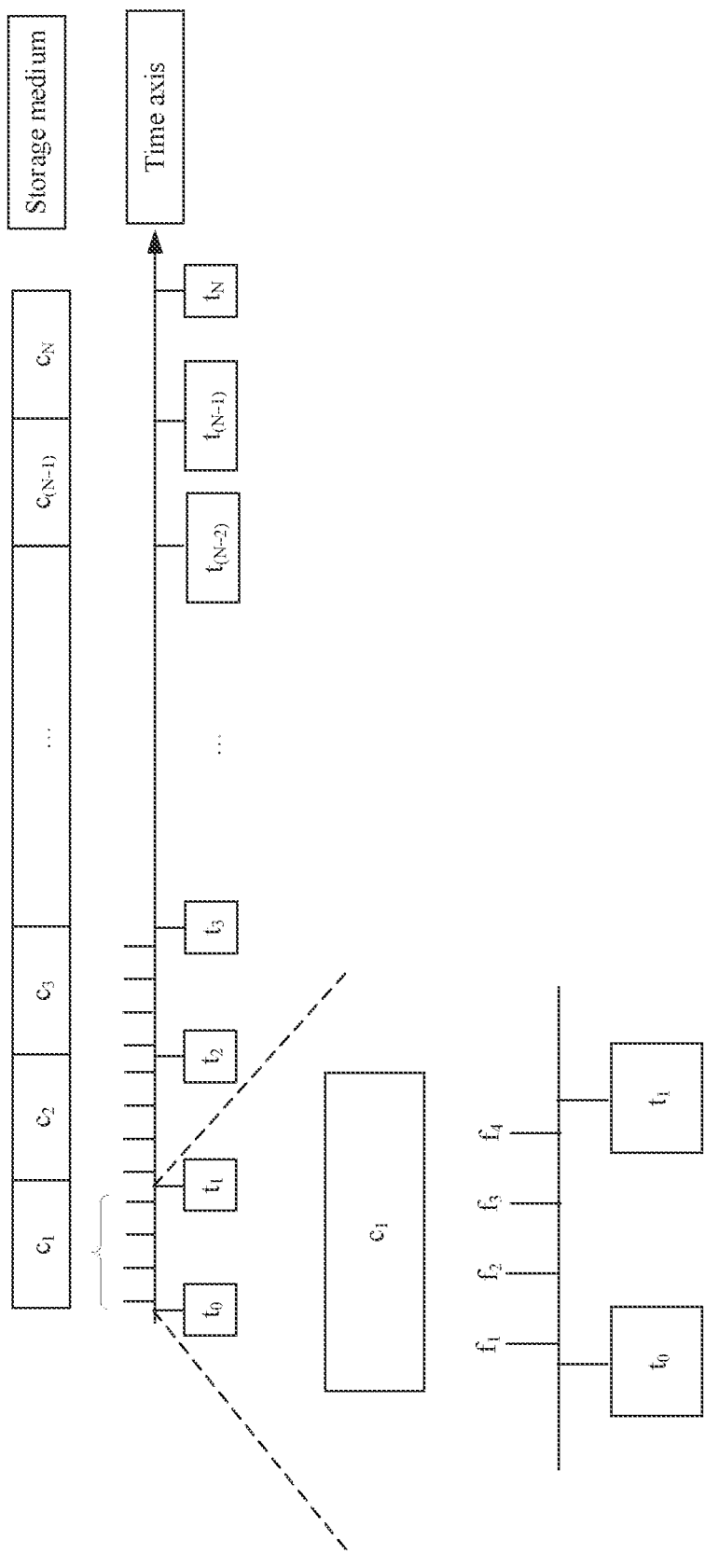
FIG. 3B to FIG. 3C are schematic diagrams of a storage process of a group of image frames according to an embodiment of this application.

Specifically, FIG. 3B is a schematic diagram of an image frame storage process according to an embodiment of this application. FIG. 3B shows a storage status of an image frame in the first storage space that is pushed with time and that is on a time axis. To better understand the image frame storage method shown in FIG. 3A, in FIG. 3B, the first storage space is divided into N storage bits, that is, $c_1$, $c_2$, $c_3$, ..., $c_{(N-1)}$, and $c_N$. It should be noted that when the electronic device performs the image frame storage method in this embodiment of this application, a mark for a storage bit in the first storage space is not necessary, and the mark in the figure is used to better explain and describe this embodiment of this application. In this embodiment of this application, a quantity of storage bits is equal to the maximum frame quantity N. In the example shown in FIG. 3B, m=4, that is, every four first image frames form one group.

Optionally, because a photographing frame rate of the electronic device is fixed, the electronic device may set a first image frame within a period of time as one group. As shown in FIG. 3B, the electronic device may set image frames in each $t_j$ duration as one group of first image frames, where $t_j=t_N-t_{(N-1)}$, and N is a positive integer and N is greater than or equal to 1. It can be learned that, when the frame rate of the electronic device remains unchanged, that the electronic device sets the first image frames within a period of time as one group is equivalent to setting m first image frames as a group of image frames. Therefore, the two manners are different only in setting forms, have a same core idea, and fall within the protection scope of this embodiment of this application.

S106: When the electronic device is in the photographing mode, the electronic device determines a second image frame that meets an image quality condition in each group of image frames, and stores the second image frame into the first storage space.

A group of image frames includes m first image frames, that is, a group of image frames includes $f_1$, $f_2$, ..., $f_m$, where m is an integer greater than or equal to 2. That the electronic device determines a second image frame that meets an image quality condition in each group of image frames specifically includes: performing a preset operation on each group of image frames to determine the second image frame.

The image quality condition is a filtering condition preset by the electronic device or entered by the user into the electronic device. Specifically, the image quality condition may be: determining an image frame with highest image quality in each group of image frames.

Specifically, the preset operation includes steps of s11 to s12.

s11: Store the image frame $f_1$ in each group of image frames in a first storage bit.

The first storage bit is a storage bit corresponding to each group of image frames in which the image frame $f_1$ is located. The image frame $f_1$ is an image frame that is first shot by the electronic device in each group of image frames.

s12: When the electronic device obtains an image frame $f_h$ through photographing, if image quality of the image frame $f_h$ is image quality of an image frame stored in the first storage bit, the electronic device updates the image frame stored in the first storage bit to the image frame $f_h$, where $2 \leq h \leq m$; and if the image quality of the image frame $f_h$ is less than or equal to image quality of an image frame stored in the first storage bit, the electronic device does not perform any operation.

Specifically, the electronic device may generate a quality evaluation value of the image frame, and the electronic device may compare values of the quality evaluation value. A larger quality evaluation value of the image frame indicates higher image quality, and a smaller quality evaluation value of the image frame indicates lower image quality. It should be noted that an image quality evaluation standard needs to be set from at least one dimension based on a specific electronic device and an actual use scenario, for example, set from dimensions such as resolution, color saturation, an image dynamic range, and a noise quantity of an image. Therefore, the image quality evaluation standard is not limited in this embodiment of this application.

Figure 3C:
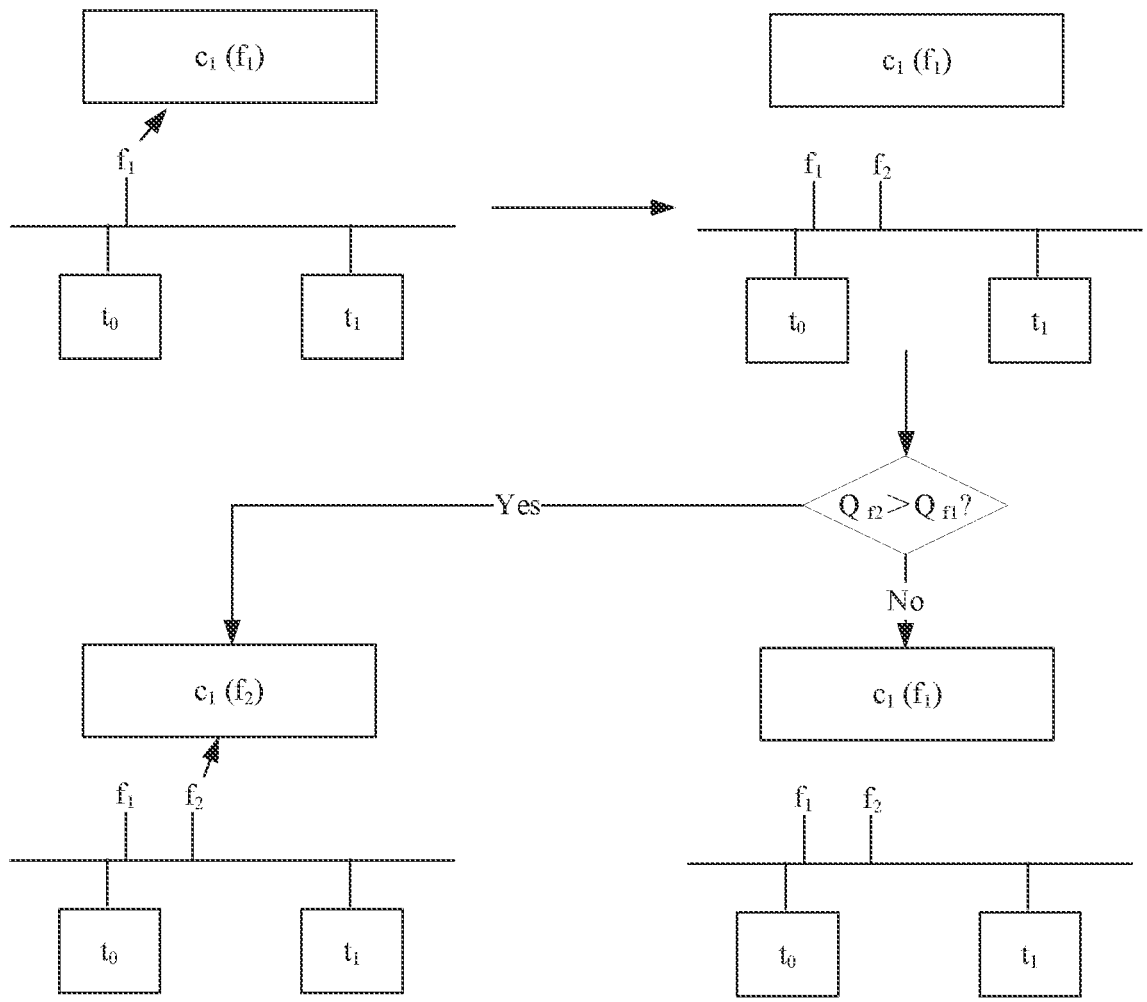

The following describes, with reference to FIG. 3B and FIG. 3C, the image frame storage method shown in FIG. 3A by using an example.

The electronic device first calculates, based on current photographing configuration information, an estimated value of a storage capacity occupied by one image frame, and then the electronic device calculates, based on the estimated value and a size of the first storage space, a maximum frame storage capacity N. Specifically, if the estimated value of the storage capacity occupied by one image frame is 10 MB, and the size of the first storage space of the electronic device is 9000 MB, the maximum frame storage capacity N=9000/10=900, that is, the electronic device stores a maximum of 900 image frames. If the frame rate R=60 Fps and the first duration T=60 s in the photographing configuration information, the electronic device determines that the total quantity F=60×60=3600. T electronic device calculates m=3600/900=4, and the electronic device determines that four image frames are a group of image frames. As shown in FIG. 3B, if $f_1$, $f_2$, $f_3$, and $f_4$ are a group of image frames, the electronic device first stores the image frame $f_1$ into a $c_1$ storage bit in the storage medium. When the image frame $f_2$ arrives, the electronic device compares image quality of the image frame $f_2$ with image quality of the image frame $f_1$ stored in the $c_1$ storage bit. If the image quality of the image frame $f_2$ is higher than the image quality of the image frame $f_1$ stored in the $c_1$ storage bit, the electronic device updates the image frame stored in the $c_1$ storage bit to the image frame $f_2$. If the image quality of the image frame $f_2$ is lower than the image quality of the image frame $f_1$ stored in the $c_1$ storage bit, the electronic device does not perform any operation. Similarly, when the image frame $f_3$ arrives, the electronic device compares image quality of the image frame $f_3$ with the image quality of the image frame stored in the $c_1$ storage bit, and determines whether to update the image stored in the $c_1$ storage bit by using the image frame $f_3$ based on a comparison result. Similarly, when the image frame $f_4$ arrives, the electronic device repeats an operation such as an operation performed when the image frame $f_2$ arrives and an operation performed when the image frame $f_3$ arrives. It can be learned that, by using the foregoing operations, the electronic device may finally store an image frame with highest image quality in $f_1$, $f_2$, $f_3$, and $f_4$ into the $c_1$ storage bit.

FIG. 3C is a possible schematic diagram of a group of image frames shown in FIG. 3B when image frames $f_1$ and $f_2$ arrive in a storage process. When the image frame $f_1$ arrives, the electronic device stores the image frame $f_1$ in the $c_1$ storage bit in the storage medium. When the image frame $f_2$ arrives, the electronic device may generate image quality $Q_{f1}$ corresponding to the image frame $f_1$ and image quality $Q_{f2}$ corresponding to the image frame $f_2$. Then, the electronic device determines whether $Q_{f2}$ is greater than Q $f_1$. If $Q_{f2} > Q_{f1}$, the electronic device overwrites the image frame $f_2$ into the $c_1$ storage bit. If $Q_{f2} \leq Q_{f1}$, the electronic device does not perform any operation. Similarly, the foregoing operations are performed on the image frame $f_3$ and the image frame $f_4$, so that an image frame with highest image quality in the group of image frames can be selected.

It can be learned that an image frame with highest image quality in a group of image frames may be selected through the foregoing operations, and the image frame with the highest image quality is stored in the $c_1$ storage bit. The foregoing operations may be repeated, so that an image frame with highest image quality in each group of image frames may be stored in the storage medium. In this way, the electronic device extends a time span of the stored image frame (specifically, in the foregoing example, if the electronic device stores, in the storage medium, an image frame obtained by photographing each frame, the electronic device can store only image frames within 15 s, and in the method in this embodiment of this application, the electronic device can store image frames within 60 s). This improves the image quality of the stored image frame, and improves experience of browsing an image by using the electronic device by the user.

Figures 1, 3D:
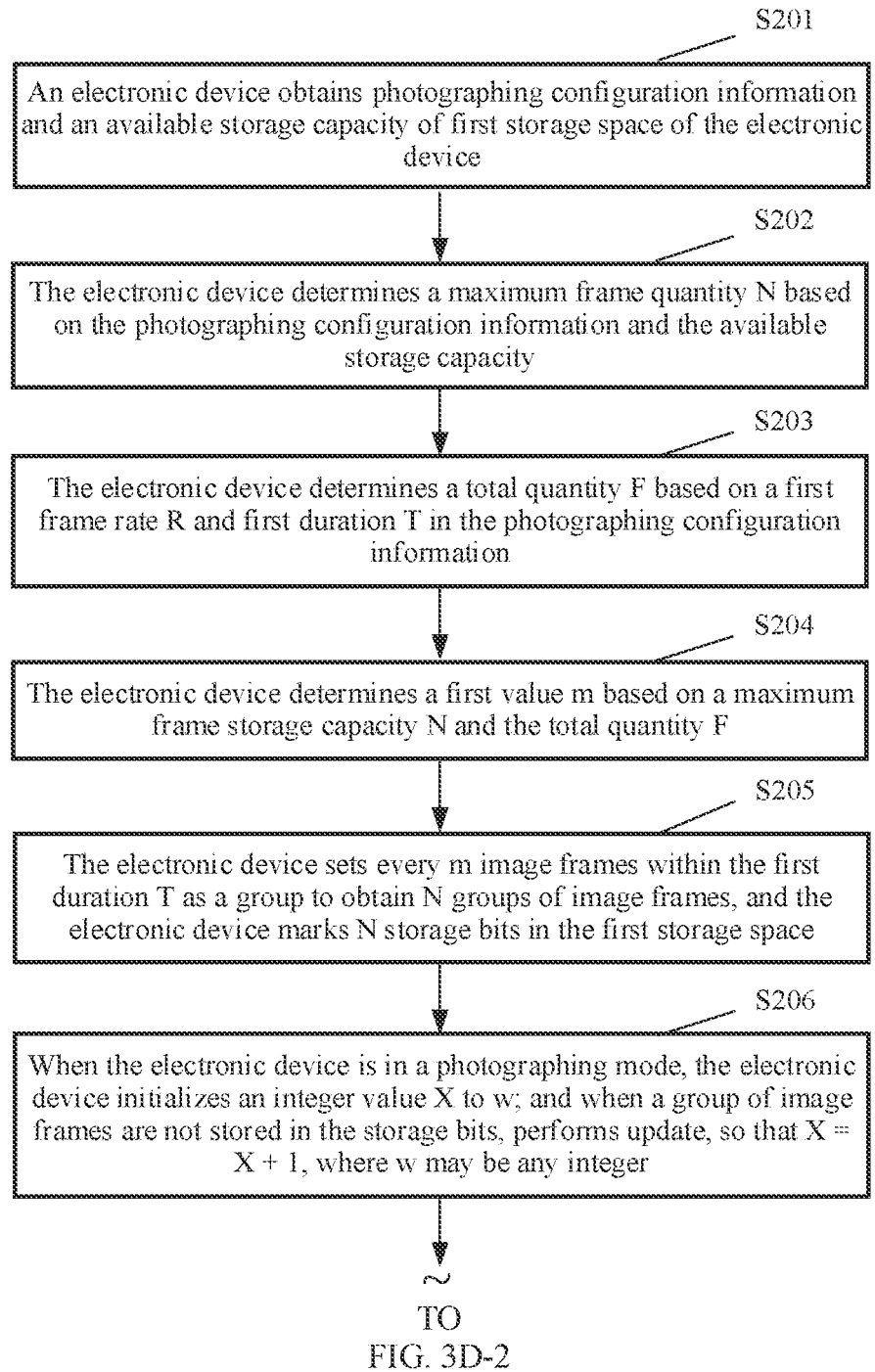

The following embodiment describes another image frame storage method provided in this embodiment. As shown in FIG. 3D-1 and FIG. 3D-2, the method may include the following steps.

S201: An electronic device obtains photographing configuration information and an available storage capacity of first storage space of the electronic device.

For description of the photographing configuration information, refer to related descriptions of S101. Details are not described herein again.

S202: The electronic device determines a maximum frame quantity N based on the photographing configuration information and the available storage capacity.

The electronic device may be provided with a cache, an internal memory, and an external memory. Specifically, the available storage capacity in this embodiment of this application may indicate a capacity that can be used in any one of the foregoing storage media based on an application scenario. For example, the available storage capacity may indicate a capacity that can be used in the cache of the electronic device.

S203: The electronic device determines a total quantity F based on a first frame rate R and first duration T in the photographing configuration information.

For explanations and descriptions of the total quantity F, refer to related descriptions of S103. Details are not described herein again.

S204: The electronic device determines a first value m based on a maximum frame storage quantity N and the total quantity F.

For explanations and descriptions of the first value, refer to S104.

S205: The electronic device sets every m image frames in the first duration T as a group to obtain N groups of image frames, and the electronic device marks N storage bits in the first storage space.

S206: When the electronic device is in a photographing mode, the electronic device initializes an integer value X to w, and when a group of image frames are not stored in a storage bit, performs update, so that X=X+1, where w may be any integer. Specifically, w may be 0.

Specifically, "X=X+1" indicates that a value of X after the update is a value of X before the update plus 1.

For example, if an image frame in a first group of image frames is stored in the storage bit. X remains unchanged, and X=w; and if no image frame in a second group of image frames is stored in the storage bit, update is performed, so that X=X+1=w+1. A case in which X decreases is described subsequently.

S207: After obtaining an image frame $f_{11}$ through photographing, the electronic device stores the image frame $f_{11}$ in a $c_1$ storage bit, and sets $c_{last}=c_1$, where $Q_{last}$ represents a quality evaluation value corresponding to an image frame stored in a $c_{last}$ storage bit.

The image frame $f_{11}$ represents a first image frame in the first group of image frames, and the N storage bits are $c_1$, $c_2$, $c_3$, ..., $c_{(N-1)}$, and $c_N$.

S208: After obtaining an image frame $f_{kh}$ through photographing, the electronic device calculates a quality evaluation value $Q_{fkh}$ of the image frame $f_{kh}$ and a difference value $\Delta$ between the image frame $f_{kh}$ and a third image frame, where the difference value $\Delta$ is used to indicate a degree of difference between the image frame $f_{kh}$ and the third image frame, and the third image frame is an image frame stored in the $c_{last}$ storage bit.

In this embodiment of this application, a larger difference value $\Delta$ between two image frames indicates a smaller similarity between image content of the two image frames.

The image frame $f_{kh}$ represents an $h^{th}$ image frame in a $k^{th}$ group of image frames.

Specifically, the electronic device includes an image quality evaluation module and an image difference comparison module. After the electronic device inputs an image frame to the image quality evaluation module, the image quality evaluation module may output a quality evaluation value of the image frame. A higher quality evaluation value indicates higher quality of an image presented based on the image frame. After the electronic device inputs two image frames into the image difference comparison module, the image difference comparison module may output a difference value between the two image frames. A larger difference value between the two image frames indicates a larger difference between the two image frames.

S209: If the third image frame and the image frame $f_{kh}$ do not belong to a same group of image frames, $\Delta>\Delta_{thrd}$, and $Q_{fkh}>Q^{thrd}$, update last to last+1, and store the image frame $f_{kh}$ in the $c_{last}$ storage bit.

$\Delta_{thrd}$ is a threshold corresponding to a preset difference value, and $Q_{thrd}$ is a threshold corresponding to a preset image quality value.

Updating last to last+1 means that the electronic device updates $c_{last}$ and $Q_{last}$ simultaneously, that is, $c_{last}=c_{last}+1$, and $Q_{last}=Q_{last+1}=Q_{fkh}$.

Figure 3E:
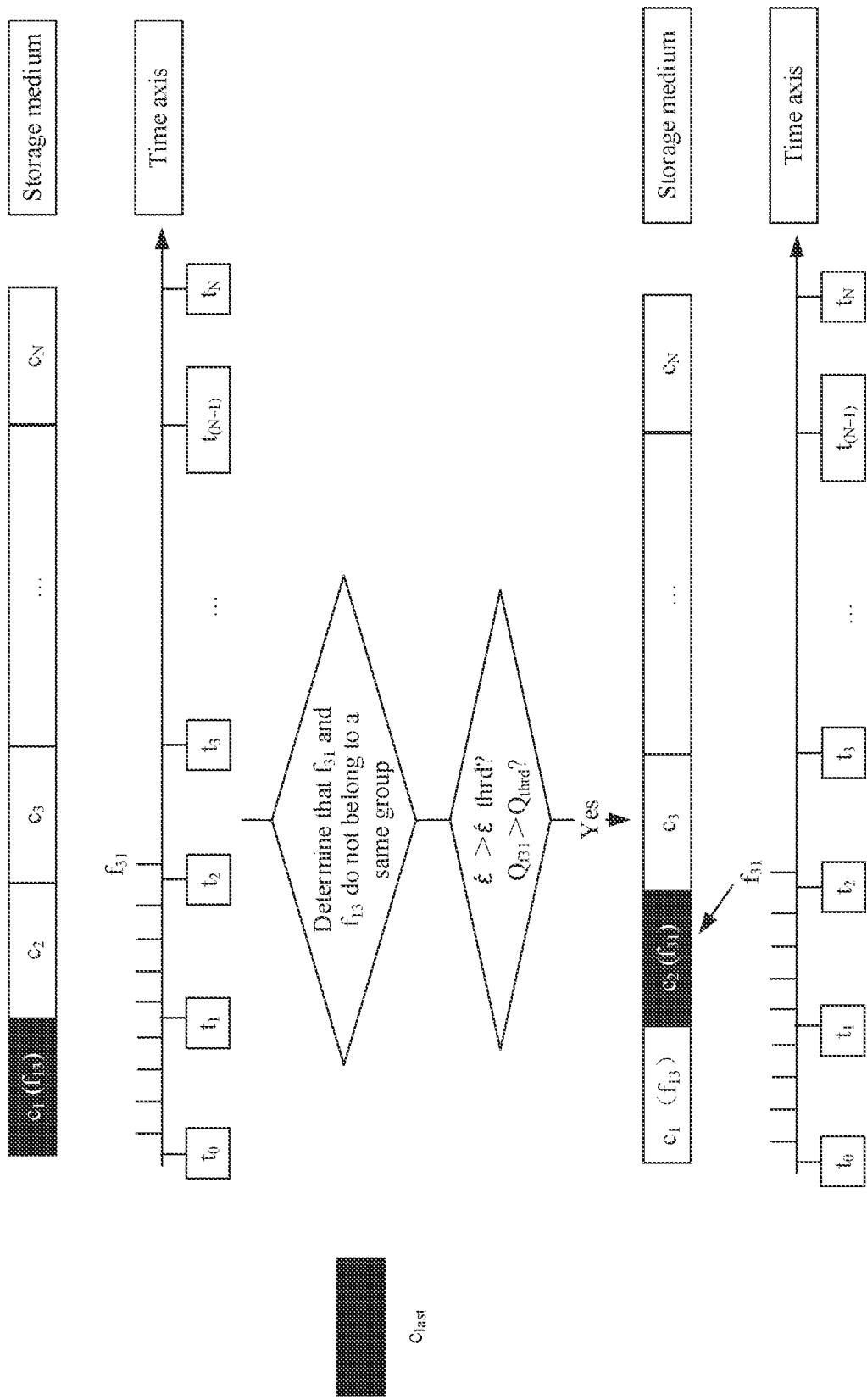
FIG. 3E to FIG. 3G are schematic diagrams of a storage process of another group of image frames according to an embodiment of this application.
Figure 4A:
FIG. 4A to FIG. 4B are example diagrams of a group of possible scenarios according to an embodiment of this application.
Figure 4A:

For example, FIG. 3E is a schematic diagram of a possible image frame storage process according to an embodiment of this application. In FIG. 3E, before an image frame $f_{31}$ arrives, the $c_1$ storage bit stores an image frame $f_{13}$. In this case, $c_{last}=c_1$, and the third image frame is the image frame $f_{13}$. Because a group of image frames generated by the electronic device between $t_1$ and $t_2$ are not stored in the storage medium, in this case, X=w+1. When the image frame $f_{31}$ arrives, the electronic device determines that the image frame $f_{31}$ and the image frame $f_{13}$ stored in $c_1$ do not belong to a same group. The electronic device calculates a quality evaluation value $Q_{f31}$ of the image frame $f_{31}$ and a difference value $\Delta$ between the image frame $f_{31}$ and the image frame $f_{13}$. Then, the electronic device determines whether $\Delta$ and $Q_{f31}$ meet $\Delta>\Delta_{thrd}$ and $Q_{f31}>Q_{thrd}$. When the foregoing conditions are met, the electronic device updates last=2, that is, $c_{last}=c_2$, and stores the image frame $f_{31}$ in the $c_2$ storage bit. FIG. 4A is a possible scenario example in the foregoing example. FIG. 4A includes an image P1 and an image P2, where the image P1 may be an image corresponding to the image frame $f_{13}$, and the image P2 may be an image frame corresponding to the image frame $f_{31}$. A person in the image P2 moves a large distance compared with a person in the image P1. Therefore, a difference between P2 and P1 is large, and image quality of the image P2 meets a preset image quality standard. Therefore, the electronic device stores the image frame $f_{31}$ corresponding to the image P2 in the $c_2$ storage bit.

S210: If the third image frame and the image frame $f_{kh}$ belong to a same group of image frames, $\Delta>\Delta_{thrd}$, $Q_{fkh}>Q_{thrd}$, and X>w; perform update, so that last=last+1 and X=X-1, and store the image frame $f_{kh}$ in the $c_{last}$ storage bit.

"X=X-1" indicates that a value of X after update is obtained by subtracting 1 from a value of X before update.

Figure 3F:
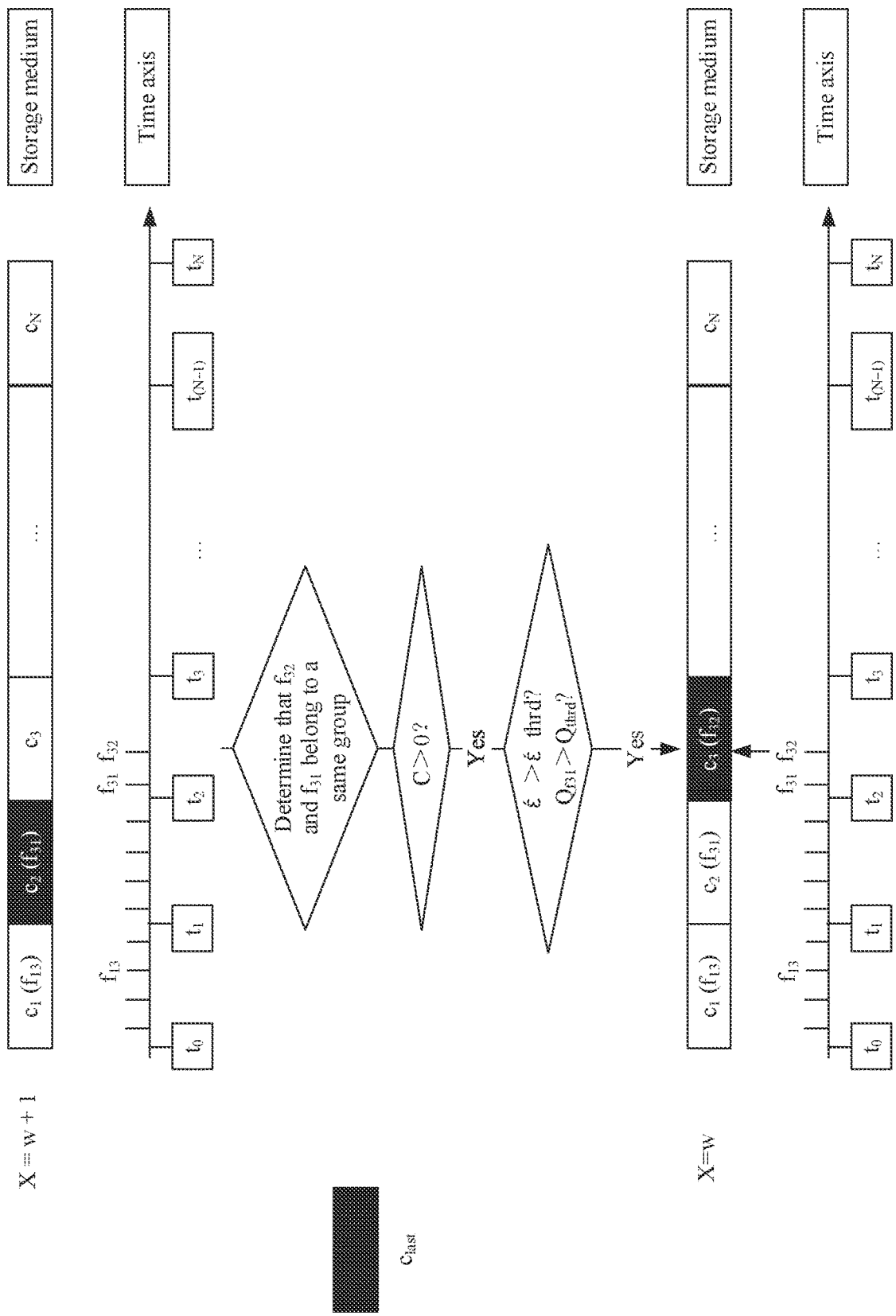

FIG. 3F is a schematic diagram of a possible image frame storage process according to an embodiment of this application. Following the example shown in FIG. 3E, when an image frame $f_{32}$ arrives, the electronic device first determines that the image frame $f_{32}$ and the image frame $f_{31}$ stored in $c_2$ belong to a same group of image frames. Then, the electronic device detects a value of X. In this case, X=w+1>w. The electronic device calculates a difference value $\Delta$ between the image frame $f_{32}$ and the image frame $f_{31}$ and a quality evaluation value $Q_{f32}$ of the image frame $f_{32}$. Then, the electronic device determines whether $\Delta$ and $Q_{f32}$ meet $\Delta>\Delta_{thrd}$ and $Q_{f32}>Q_{thrd}$. When $\Delta>\Delta_{thrd}$ and $Q_{f32}>Q_{thrd}$, the electronic device performs update, so that X=X-1=w-1=w and last=3, that is, $c_{last}=c_3$, and stores the image frame $f_{32}$ in a $c_3$ storage bit. FIG. 4A is a possible scenario example in the foregoing example. FIG. 4A includes an image P1 and an image P2. The image P1 may correspond to the image frame $f_{31}$, the image P2 may correspond to the image frame $f_{32}$, the image P2 differs greatly from the image P1, and image quality of the image P2 meets a preset image quality standard. Therefore, when X>w, the image frame $f_{32}$ may be stored in the $c_3$ storage bit.

S211: If the third image frame and the image frame $f_{kh}$ belong to a same group of image frames, X=w, and $Q_{fkh}>Q_{last}$, the electronic device overwrites and stores the image frame $f_{kh}$ into the $c_{last}$ storage bit.

Figure 3G:
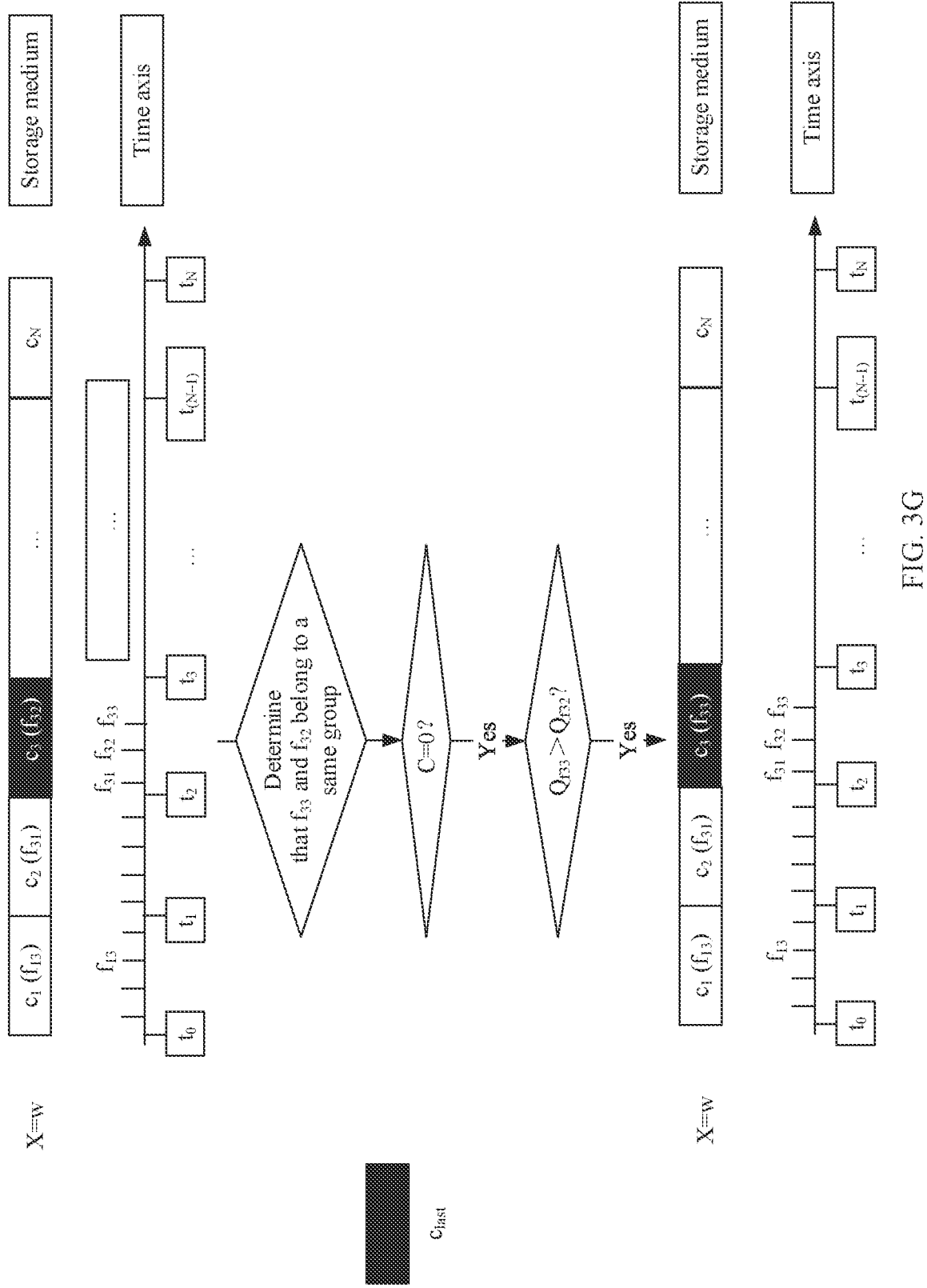
Figure 4B:
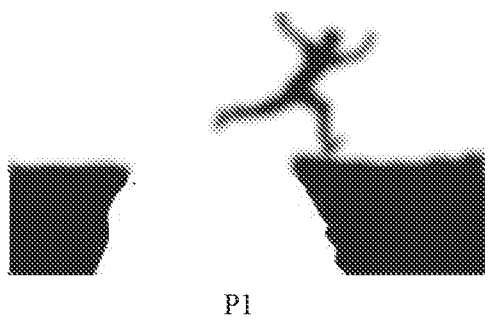
Figure 4B:

For example, FIG. 3G is a possible image frame storage example according to an embodiment of this application. Following the example shown in FIG. 3F, when an image frame $f_{33}$ arrives, the electronic device first determines that the image frame $f_{33}$ and the image frame $f_{32}$ stored in the storage bit of $c_3$ belong to a same group of image frames. Then, the electronic device detects a value of X. In this case, X=w, the electronic device obtains a quality evaluation value $Q_{f33}$ of the image frame $f_{33}$ and the quality evaluation value $Q_{f32}$ of the image frame $f_{32}$ through calculation, and then determines whether $Q_{f33}$ is greater than $Q_{f32}$, and if yes, overwrites the image frame $f_{33}$ into the $c_3$ storage bit. FIG. 4B is a possible scenario example in the foregoing example. FIG. 4B includes an image P1 and an image P2. The image P1 may be an image presented in the image frame $f_{32}$, and the image P2 may be an image presented in the image frame $f_{33}$. Because in the image P1, the person is blurred, the electronic device may determine that image quality of the image P2 is higher than image quality of the image P1. Therefore, the electronic device may update the image P1 stored in the $c_3$ storage bit to the image P2.

Optionally, if the third image frame and the image frame $f_{kh}$ belong to a same group of image frames, $\Delta \leq \Delta_{thrd}$, $Q_{fkh}>Q_{last}$, and X>w, the electronic device overwrites and stores the image frame $f_{kh}$ in the $c_{last}$ storage bit.

It can be learned that the image frame storage method shown in FIG. 3A helps improve quality of the image frame stored in the electronic device while increasing the time span of the image frame stored in the electronic device. The image frame storage method shown in FIG. 3B implements advantages of the method shown in FIG. 3A, and helps reduce a storage frequency of an image frame when a difference value is small, and improves a storage frequency of an image frame when a difference value is relatively large, so that more details in a scenario change process of the electronic device during photographing are stored. This avoids repeated storage of an image frame corresponding to a same scenario, and helps improve effective use of storage space. The foregoing method may be applied to a supermarket, a street, or the like that needs to store a shot image to a local electronic device. For example, a camera is installed on a remote street. Due to a condition limitation, the camera can only store an image frame in a local memory. Because an image currently shot by the camera is in high-definition image quality, if the camera continuously collects an image frame and stores the image frame in the memory, the memory may be fully stored within one week. If the user expects to prolong a time span for storing an image frame, effectively use storage space of the camera, and store more high-quality image frames, the method shown in FIG. 3A or FIG. 3B provided in embodiments of this application may be used based on a specific situation.

Figure 5A:
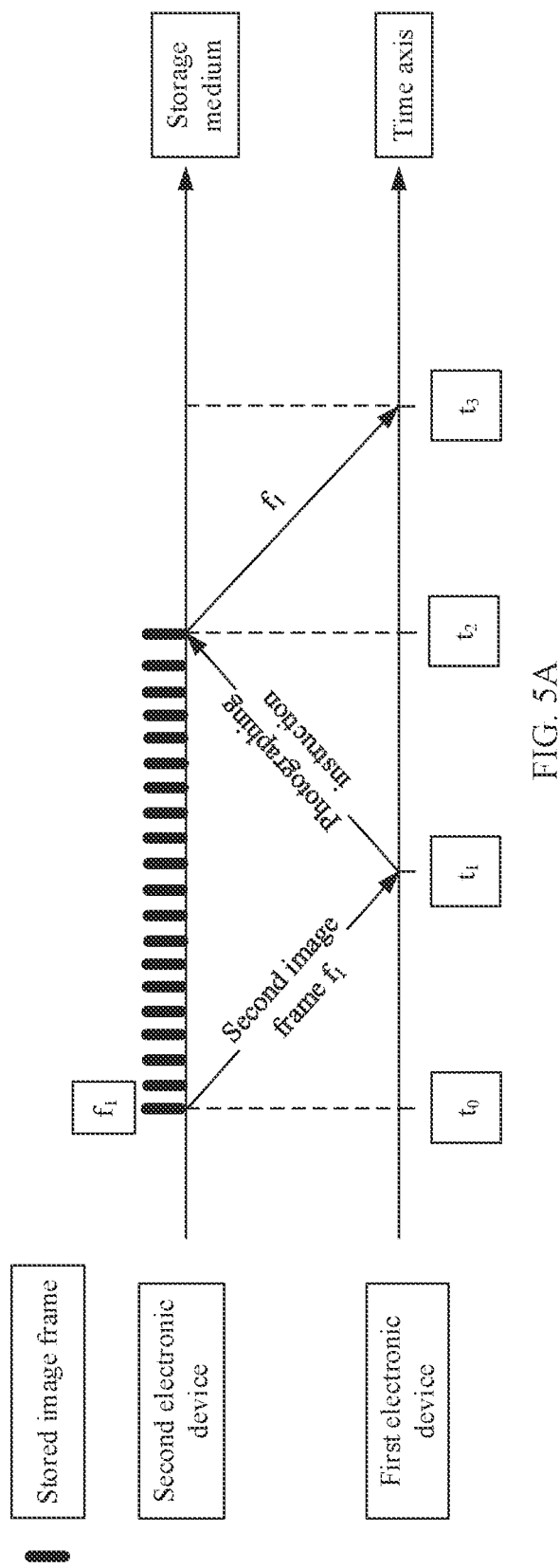
FIG. 5A to FIG. 5B are schematic interaction diagrams of a group of photographing processes according to an embodiment of this application.
Figure 5B:
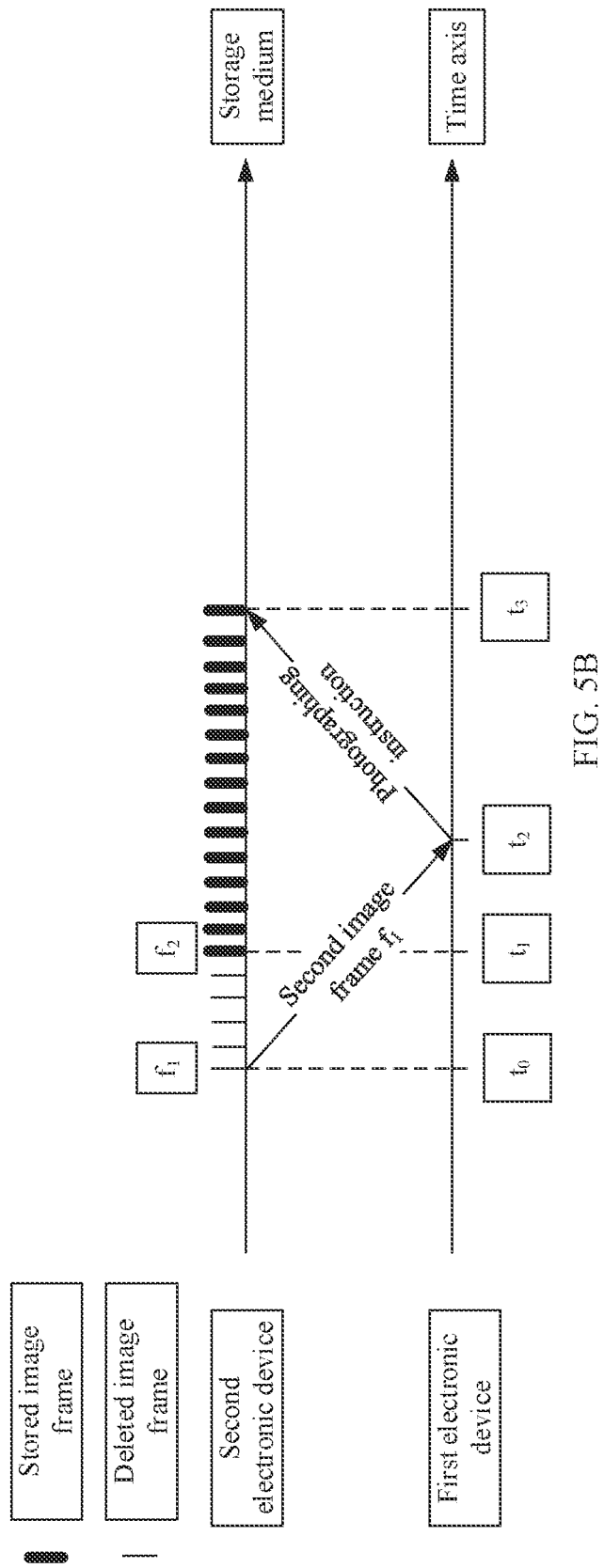

In some embodiments, a first electronic device may be communicatively connected to a second electronic device, and the first electronic device is an electronic device having a camera. The first electronic device may obtain data information by using the camera, generate a first image frame, then perform image processing on the first image frame to obtain a fifth image frame, and send the fifth image frame to the second electronic device in real time. In addition, the first electronic device stores the first image frame that meets a condition into storage space of a local end, and deletes an earliest image frame stored in a cache when the local end is full. The following provides description with reference to FIG. 5A. The user may view, on the second electronic device, the fifth image frame that is transmitted by the first electronic device in real time and that is obtained by performing image processing. When the user wants to store, at a moment $t_1$, a first image frame $f_1$ corresponding to a fifth image frame $f_1$ displayed on a display interface, the user may tap a photographing button on the second electronic device. The second electronic device generates a photographing instruction in response to a tapping operation of the user, and sends the photographing instruction to the first electronic device. The first electronic device receives, at a moment $t_2$, the photographing instruction sent by the second electronic device. Then, the first electronic device determines, according to the photographing instruction, the first image frame $f_1$ stored at a moment $t_0$, sends the first image frame $f_1$ to the second electronic device, so that the second electronic device can store the first image frame $f_1$ that is not processed through image processing. However, in an actual scenario, quality of an image frame shot by the second electronic device is high, and the shot image frame occupies a large storage capacity. In addition, because a main function of the first electronic device is photographing an image, and a specific storage space is small, the first electronic device may have deleted the first image frame $f_1$ from the storage space when receiving the photographing instruction. As a result, the first electronic device cannot send the first image frame $f_1$ to the second electronic device, and the second electronic device cannot receive and store a high-quality first image frame that is not processed, affecting user experience. The following describes an interaction process between the second electronic device and the first electronic device with reference to FIG. 5B. As shown in FIG. 5B, at the moment $t_2$, the second electronic device displays, on a display, an image presented by the fifth image frame $f_1$ that is obtained after image processing is performed on the first image frame $f_1$. When the second electronic device detects a first operation of the user at the moment $t_2$, the second electronic device sends the photographing instruction to the first electronic device, and the first electronic device receives the photographing instruction at the moment $t_3$. At the moment $t_3$, the first electronic device buffers image frames between the moment $t_1$ and the moment $t_3$, and an image frame buffered before the moment $t_1$ is deleted because the available storage capacity in the storage medium is insufficient. The first image frame $f_1$ is stored in the storage medium by the first electronic device at the moment $t_0$. Therefore, the first electronic device cannot send the first image frame $f_1$ to the second electronic device, and the first electronic device can send only an eighth image frame $f_2$ corresponding to the moment $t_1$ to the second electronic device. Because there is a specific time difference between the second image frame $f_1$ and the eighth image frame $f_2$, the eighth image frame $f_2$ may not meet viewing and browsing requirements of the user.

Figure 5C:
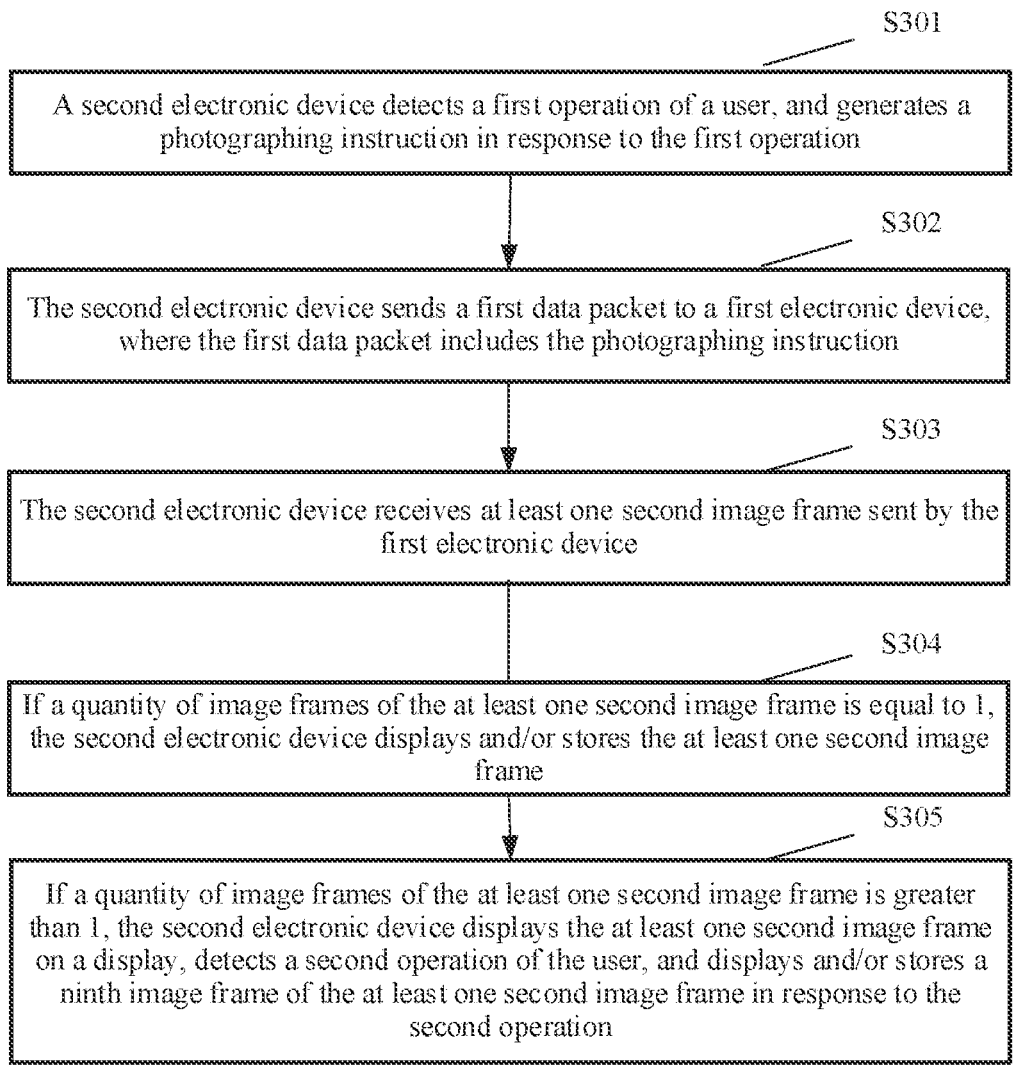
FIG. 5C is a schematic flowchart of a photographing method according to an embodiment of this application.

The following embodiments describe a photographing method provided in an embodiment of this application. FIG. 5C is a schematic flowchart of a photographing method according to an embodiment of this application. The photographing method is applied to a second electronic device. The second electronic device is communicatively connected to a first electronic device. The first electronic device is provided with a camera. When a photographing function is enabled and the first electronic device is communicatively connected to the second electronic device, the first electronic device obtains a first image frame through photographing, obtains a fifth image frame by performing image processing on the first image frame, and transmits the fifth image frame to the second electronic device in real time. A storage capacity occupied by the fifth image frame is less than a storage capacity occupied by a second image frame. At least one parameter of the fifth image frame is lower than that of the second image frame. The at least one parameter may include one or more of the following: resolution, color saturation, and an image dynamic range. The first electronic device may store the second image frame into first storage space of the first electronic device, where the second image frame is a first image frame that meets an image quality condition. The method includes:

S301: The second electronic device detects a first operation of a user, and generates a photographing instruction in response to the first operation.

The second electronic device displays an image on a display in real time based on a compressed image frame sent by the first electronic device. When viewing an image that needs to be shot, the user may perform the first operation, so that the second electronic device generates the photographing instruction. Specifically, the first operation may be a gesture operation of touching the display, performing voice control, and performing a gesture operation. The first operation is used to store an image frame corresponding to a currently displayed image.

S302: The second electronic device sends a first data packet to the first electronic device, where the first data packet includes the photographing instruction.

The first electronic device may determine at least one second image frame according to the photographing instruction.

Figure 5D:
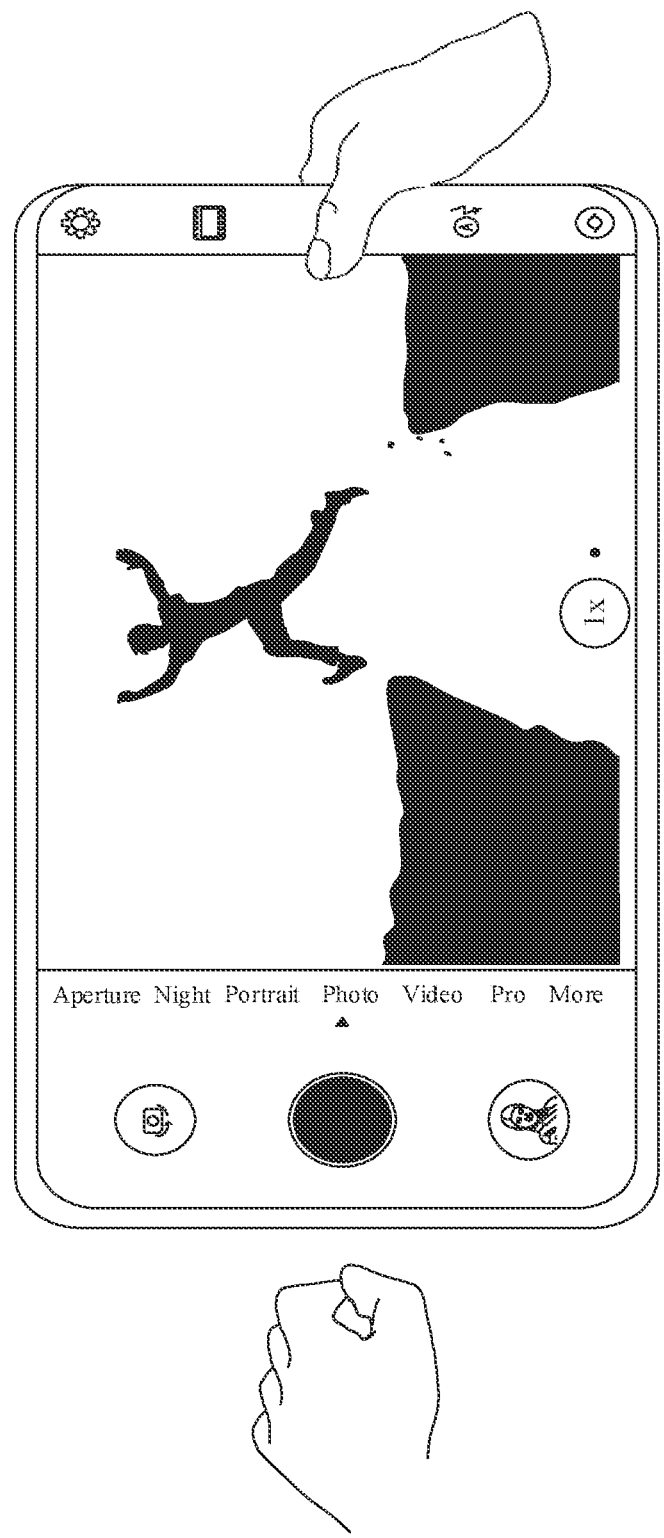
FIG. 5D to FIG. 5E are example diagrams of a group of possible photographing scenarios according to an embodiment of this application.
Figure 5E:
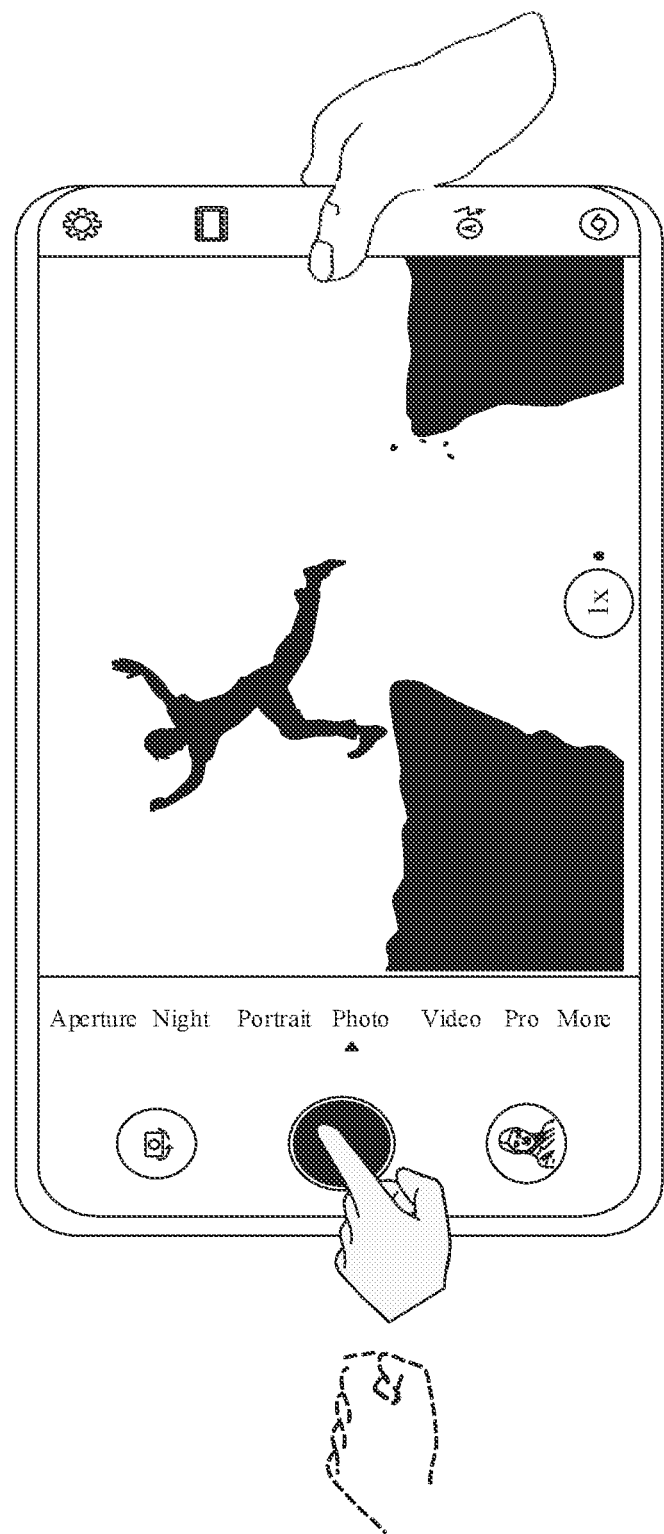
Figure 5F:
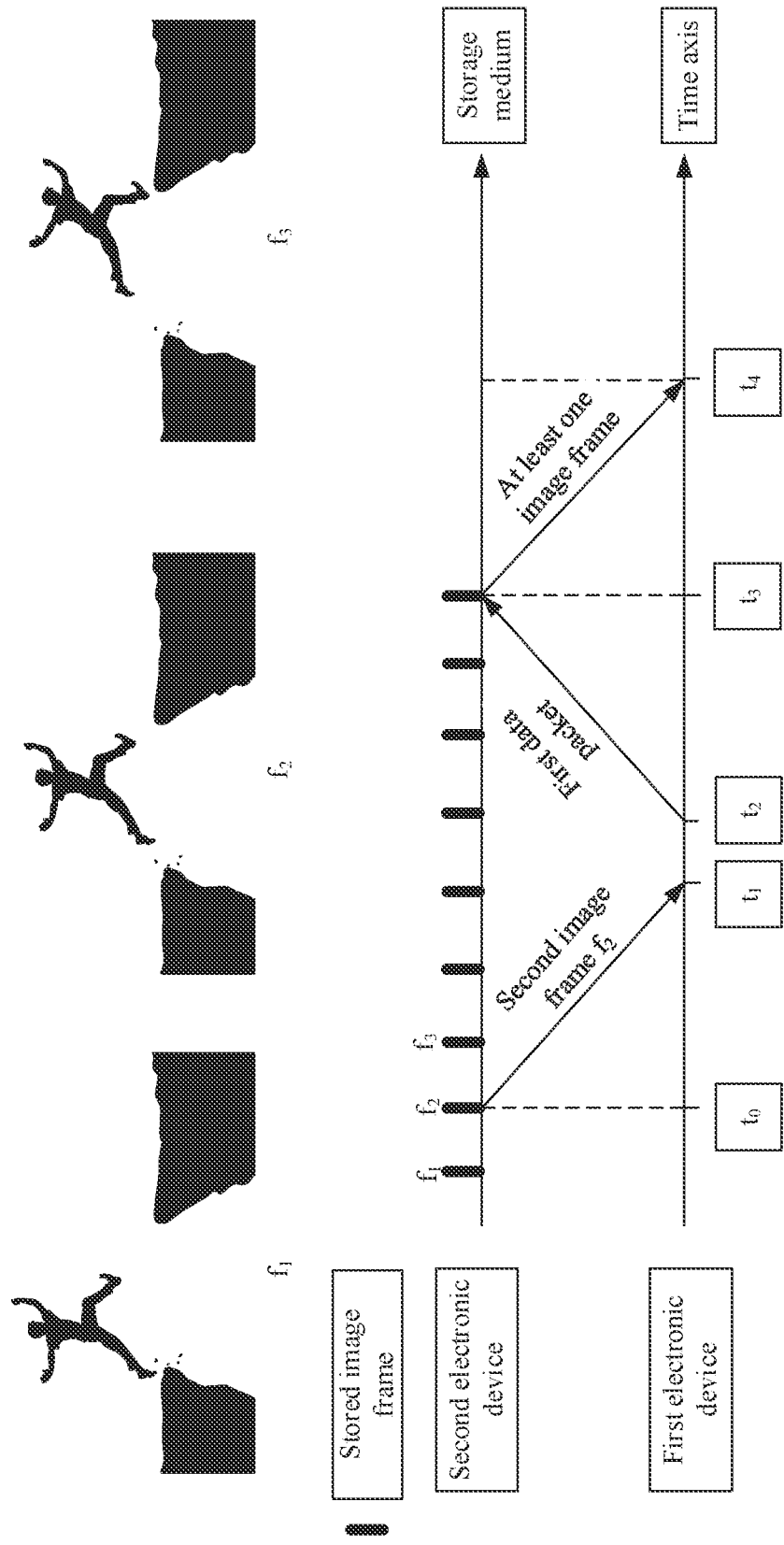
FIG. 5F is a schematic interaction diagram of a photographing process according to an embodiment of this application.

Optionally, the first data packet may further include a first delay, where the first delay includes a second delay and a third delay, and the second delay represents a delay of an entire data transmission process between the second electronic device and the first electronic device. Specifically, the second delay represents a data transmission delay between devices, the third delay represents duration between a second time point and a third time point, the second time point represents a time point at which the first operation is initiated, and the third time point represents a time point at which the electronic device detects the first operation. The electronic device may subtract the second delay and the third delay from the third time point to obtain the first time point through calculation, and determine that at least one image frame that is stored in the first storage space and that is closest to the first time point is the at least one second image frame. FIG. 5D may represent the second time point, that is, a time point at which the user initiates the first operation. In this case, there is a certain distance between a left hand in the accompanying drawing and the terminal. FIG. 5E may represent the third time point, and a left hand in the accompanying drawing has moved to the display of the second electronic device, thereby implementing a touch operation. Specifically, the second delay needs to be calculated based on a specific situation between electronic devices. A specific calculation method may be: The second electronic device sends a data packet with a timestamp to the first electronic device, or the first electronic device sends a data packet with a timestamp to the second electronic device, and the first electronic device or the second electronic device determines a data transmission delay between the first electronic device and the second electronic device based on a time point at which the data packet is received and the time stamp in the data packet. In the third delay, an empirical value corresponding to the first operation needs to be determined based on statistics of a large amount of data. Different types of first operations correspond to different empirical values. For example, the first operations in FIG. 5D and FIG. 5E are touch operations. After statistics collection is performed on the large amount of data, a probability that duration from time at which the user sees a to-be-stored image frame to time at which the electronic device detects the touch operation of the user is 0.3 seconds is greater than a preset probability threshold (the preset probability threshold may be set based on an actual situation, for example, the preset probability threshold may be set to 0.5). In this case, the empirical value corresponding to the touch control operation is 0.3 seconds, and it is determined that the third delay is equal to 0.3 seconds. When the first operation is the voice control, if statistics collection is performed on a large amount of data, a probability that duration between time at which the user sends a voice instruction and time at which the electronic device detects that the voice instruction is 1 second is greater than the preset probability threshold, an empirical value of the voice control is 1 second, and the third delay is equal to 1 second. Referring to FIG. 5F, in FIG. 5F, $t_0$ is the first time point described above, that is, indicates a time point at which the first electronic device shoots and stores a first image frame (that is, a second image frame $f_2$) that meets the image quality condition. $t_0$ may further indicate a time point at which the first electronic device performs image processing on the second image frame $f_2$ to obtain a fifth image frame $f_2$ and sends the fifth image frame $f_2$ to the second electronic device. $t_1$ indicates the second time point described above, that is, a time point at which the user initiates the first operation. $t_2$ represents the third time point described above, that is, a time point at which the second electronic device detects the first operation. $t_3$ represents a time point at which the first electronic device receives the first data packet and sends the at least one second image frame to the second electronic device. It may be understood that, in an actual scenario, because the first electronic device needs to process and parse the first data packet, the time point at which the first electronic device receives the first data packet and the time point at which the first electronic device sends the at least one second image frame to the second electronic device are not a same time point. However, because an entire parsing and processing process consumes extremely short duration, the entire parsing and processing process is ignored in the calculation process in this example. If a transmission delay of this part is introduced, the transmission delay should also fall within the protection scope of this embodiment of this application. $t_4$ represents a time point at which the second electronic device receives the at least one second image frame. Duration between $t_0$ and $t_1$, duration between $t_2$ and $t_3$, and duration between $t_3$ and $t_4$ may all be considered as the second delay, that is, the data transmission delay between the second electronic device and the first electronic device. The duration between $t_1$ and $t_2$ may be considered as the third delay, that is, the time point at which the first operation is initiated to the time point at which the second electronic device detects the first operation.

S303: The second electronic device receives the at least one second image frame sent by the first electronic device.

It should be noted that the first electronic device may determine a fourth image frame based on the first delay in the first data packet. The at least one second image frame may include a seventh image frame, and Y image frames before and/or after the seventh image frame, where Y is a positive integer. Referring to FIG. 5F, in FIG. 5F, the first electronic device determines, based on data in the first data packet, that an image frame that the user wants to store is most likely to be a seventh image frame $f_2$ stored at the moment $t_0$. Then, the first electronic device may determine that the seventh image frame $f_2$ and image frames $f_1$ and $f_3$ before and after the seventh image frame $f_2$ jointly form three second image frames. Then, the first electronic device sends the three second image frames to the second electronic device.

S304: If a quantity of image frames of the at least one second image frame is equal to 1, the second electronic device displays and/or stores the at least one second image frame.

S305: If the quantity of image frames of the at least one second image frame is greater than 1, the second electronic device displays the at least one second image frame on the display, detects a second operation of the user, and displays and/or stores a ninth image frame in the at least one second image frame in response to the second operation.

The second operation is used to select the ninth image frame from the at least one second image frame. Specifically, the second operation is an interaction operation detected by the electronic device, and may be a gesture operation, a voice control instruction, a touch control operation, or the like. This is not limited herein.

Figure 5G:
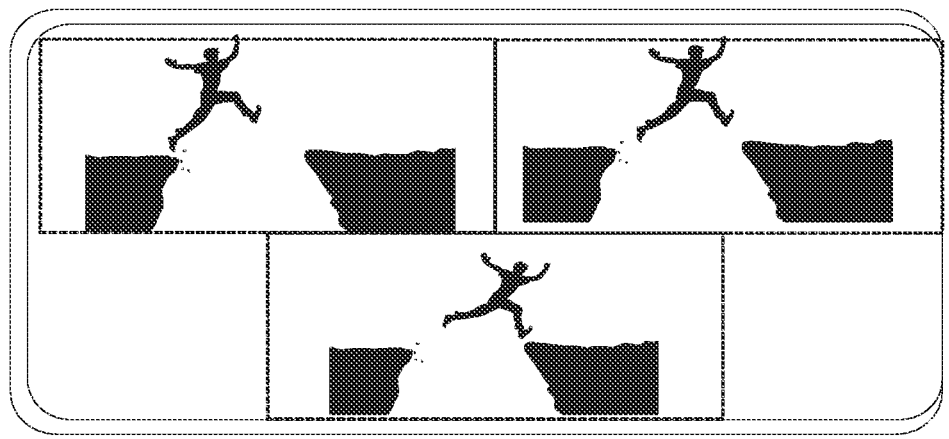
FIG. 5G to FIG. 5I are example diagrams of a group of possible scenarios according to an embodiment of this application.
Figure 5H:
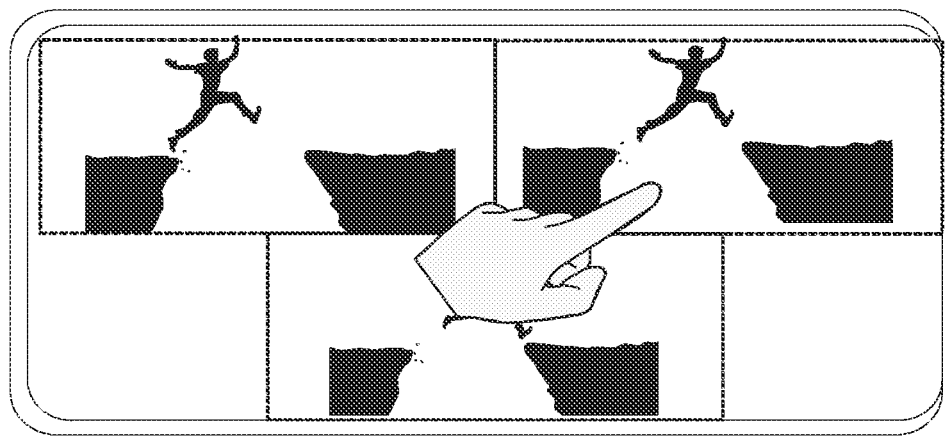
Figure 5I:
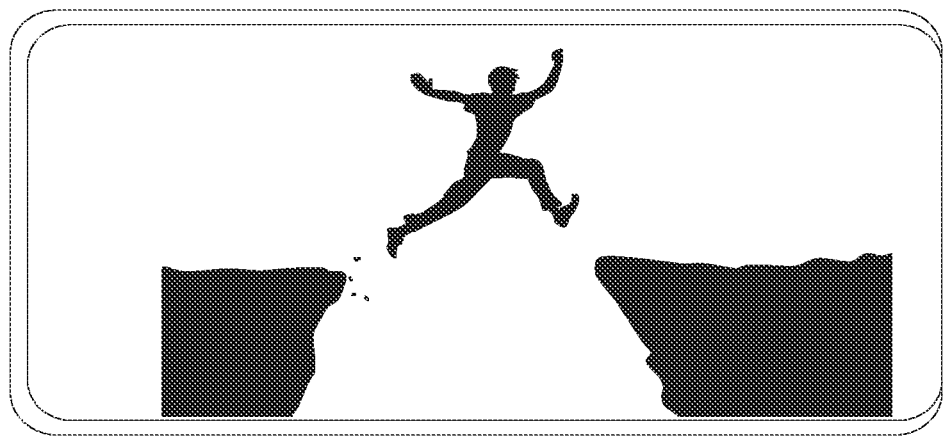

For example, FIG. 5G to FIG. 5I are schematic diagrams of a group of possible scenarios. In FIG. 5G, the second electronic device receives three image frames sent by the first electronic device, and displays the three image frames on the display. In FIG. 5H, the user touches the ninth image frame in the three image frames. In FIG. 5I, the second electronic device displays, on the display, the ninth image frame that is touched by the user.

Figure 6:
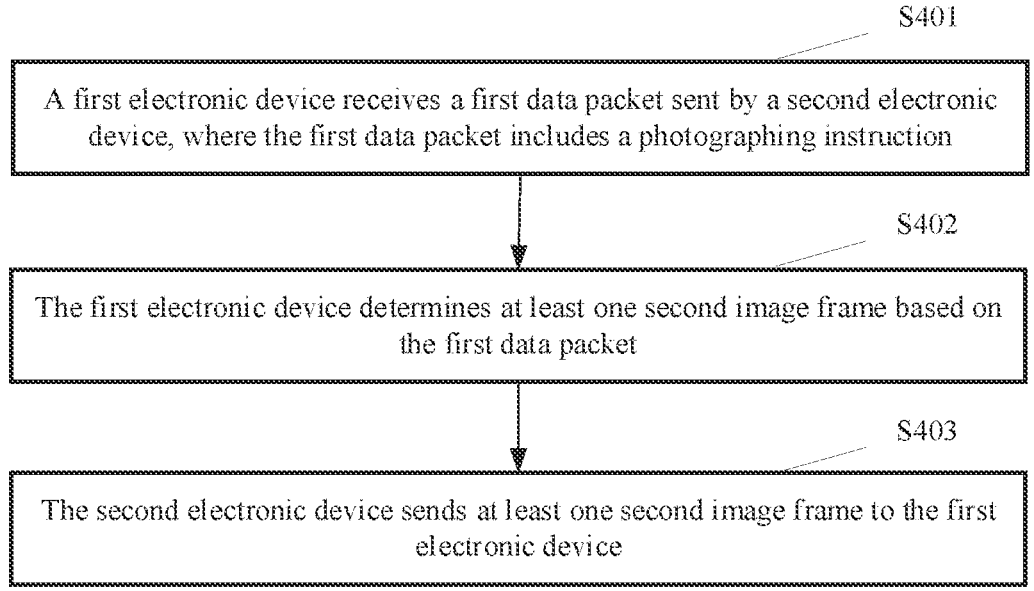
FIG. 6 is a schematic flowchart of a photographing method according to an embodiment of this application.

The following embodiment describes another photographing method provided in an embodiment of this application. FIG. 6 is a schematic flowchart of another photographing method according to an embodiment of this application. The method is applied to a first electronic device. The first electronic device is communicatively connected to a second electronic device. The first electronic device is provided with a camera. When a photographing function is enabled and the first electronic device is communicatively connected to the second electronic device, the first electronic device may process a shot second image frame to obtain a fifth image frame, and send the fifth image frame to the second electronic device in real time. A storage capacity occupied by the fifth image frame is less than a storage capacity occupied by the second image frame. At least one parameter of the fifth image frame is lower than that of the second image frame. The at least one parameter may be one or more of the following: resolution, color saturation, and an image dynamic range. The first electronic device may store the second image frame into first storage space of the first electronic device, where the second image frame is a first image frame that meets an image quality condition. The method includes:

S401: The first electronic device receives a first data packet sent by a second electronic device, where the first data packet includes a photographing instruction.

S402: The first electronic device determines at least one second image frame based on the first data packet.

Specifically, the first electronic device may be a camera. The first electronic device obtains a fifth image frame after performing image processing on the first image frame obtained through photographing, and sends the fifth image frame to the second electronic device. In addition, the first electronic device may store the second image frame obtained through photographing into a buffer, so that when receiving a photographing instruction of the second electronic device, the first electronic device sends the second image frame that meets the condition to the second electronic device. Specifically, the method for storing the second image frame by the first electronic device may be the image frame storage method shown in FIG. 3A or FIG. 3D-1 and FIG. 3D-2. It should be noted that, in this example, the first electronic device uses the image frame storage method shown in FIG. 3A or FIG. 3D-1 and FIG. 3D-2, the first duration T may be greater than or equal to duration between a first time point and a fourth time point, the first time point is a time point at which the first electronic device collects a second image frame, and the first time point may be a time point to shown in FIG. 5F. The fourth time point is a time point at which the first electronic device receives the first data packet, and the fourth time point may be a time point $t_3$ shown in FIG. 5F.

The following describes, with reference to FIG. 5F, a main idea of determining the at least one second image frame. The fifth image frame sent by the first electronic device to the second electronic device includes a timestamp, the fifth image frame is obtained by performing image processing on the second image frame, the timestamp represents the first time point at which the second image frame is shot, and the first time point may be a time point to shown in FIG. 5F. The first data packet includes the timestamp and a third delay. For explanation and description of the third delay, refer to step S302. The time point at which the first operation is initiated is the second time point, and the second time point may be a time point $t_1$ shown in FIG. 5F. A time point at which the second electronic device detects the first operation of the user is a third time point, and the third time point may be a time point $t_2$ shown in FIG. 5F. The electronic device (the first electronic device or the second electronic device) may obtain a second time point through calculation based on the third time point and the third delay. With reference to FIG. 5F, $t_1 = t_2 - L_1$, where $L_1$ represents the third delay. The electronic device (the first electronic device or the second electronic device) determines the first time point to based on the second time point and the timestamp in the fifth image frame received at the second time point. Then, the first electronic device determines the at least one second image frame based on the first time point to. Specifically, the first electronic device may first determine a seventh image frame whose storage time point is closest to the time point to. Then, the first electronic device determines the seventh image frame. The Y image frames before and/or after the seventh image frame jointly form the at least one second image frame, where Y is a positive integer.

Optionally, the first data packet includes a first delay, and the first delay includes a second delay and a third delay. For explanations and descriptions of the first delay, the second delay, and the third delay, refer to step S302. A time point at which the first electronic device collects the second image frame is the first time point, and the first time point may be the time point $t_0$ shown in FIG. 5F. A time point at which the first electronic device receives the first data packet is the fourth time point, and the fourth time point may be the time point $t_3$ shown in FIG. 5F. The first electronic device may determine, based on the fourth time point $t_3$, the second delay, and the third delay, the time point to at which the second image frame is collected. Specifically, with reference to FIG. 5F, $t_0 = t_3 - L_1 - 2 \times L_2$, where $L_1$ represents the third delay, and $L_2$ represents the second delay. Specifically, referring to FIG. 5F, $L_1$ indicates duration between $t_1$ and $t_2$, and $L_2$ may indicate duration between to and $t_1$ or duration between $t_2$ and $t_3$.

Optionally, with reference to FIG. 5F, the first data packet includes the first delay (the first delay is formed by a second delay and a third delay) and the third time point $t_2$ at which the second electronic device detects the first operation of the user. The first electronic device may determine, based on the first delay and the third time point, that a time point at which the electronic device shoots the second image frame is the first time point. The first time point may be the time point $t_0$ shown in FIG. 5F. Specifically, $t_0 = t_2 - L_1 - L_2$, where $L_1$ represents the third delay, and $L_2$ represents the second delay.

Optionally, with reference to FIG. 5F, the first data packet includes the first time point $t_0$ described above, that is, the second electronic device obtains the first time point $t_0$ through calculation based on the touch time point $t_2$ at which the first operation of the user is detected, the second delay, and the third delay, and then packs the first time point to into the first data packet, so that the first electronic device does not need to perform further calculation when receiving the first data packet.

S403: The first electronic device sends the at least one second image frame to the second electronic device.

It can be learned that, in the foregoing example, the first electronic device may determine the at least one second image frame based on one or more of the following data: a delay, a touch time point, a time point at which the first data packet is received, a time point corresponding to a timestamp in an image frame, and the foregoing data, and send the at least one second image frame to the second electronic device, so as to meet a requirement for viewing a high-quality image in the second electronic device.

Figure 7:
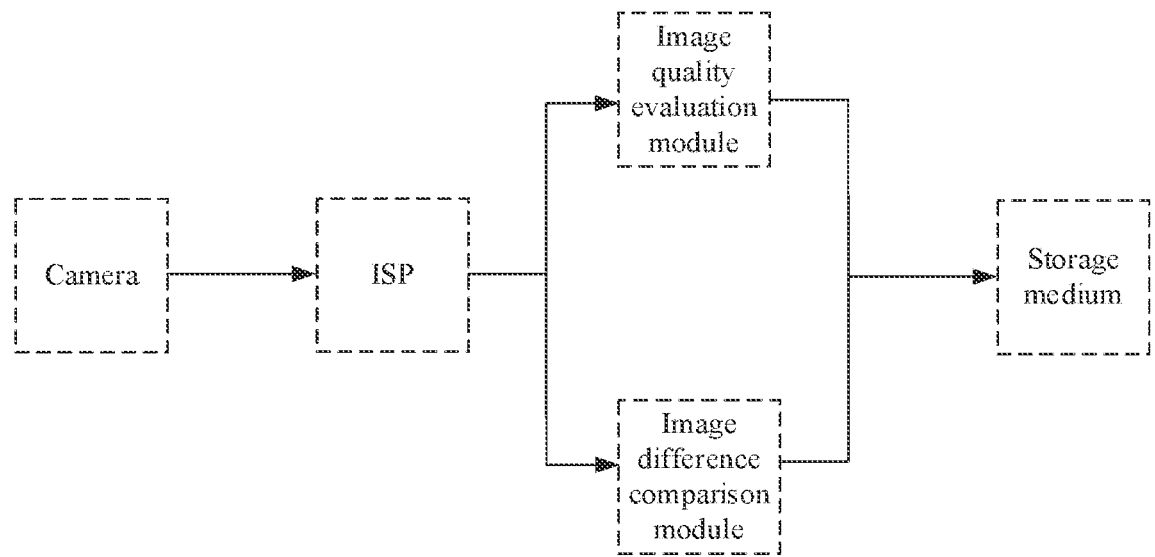
FIG. 7 is a schematic modular diagram of an electronic device according to an embodiment of this application.

The following describes, with reference to FIG. 7, a procedure in which the first electronic device stores an image frame in the foregoing embodiments. As shown in FIG. 7, a camera of the first electronic device first collects data, and generates an image frame; and then outputs the image frame to an image signal processor (Image Signal Processor, ISP). The ISP processes the image frame, which may specifically include automatic exposure, automatic white balance, and automatic focus (auto exposure, auto white balance, auto focus, 3A) processing, and may further optimize algorithms of noise, brightness, and skin color of the image. After the image frame is processed by the ISP, an image quality evaluation module may generate a quality evaluation value of the image frame, and an image difference comparison module may generate a difference value between the image frame and another image frame. Then, when both the image quality evaluation value and the difference value meet an image quality condition, the image frame is stored in a storage medium. For specific content of the image quality condition, refer to the condition for storing the image frame described in embodiments in FIG. 3A and FIG. 3D-1 and FIG. 3D-2. Details are not described herein again. The storage medium may be a cache of the first electronic device. It should be noted that, in the embodiment shown in FIG. 3A, the first electronic device determines, based on only the quality evaluation value, whether to store the image frame in the storage medium. Therefore, in this embodiment, an image difference comparison module is not disposed in the first electronic device.

It should be noted that the image quality evaluation module and the image difference comparison module in FIG. 7 are presented in a parallel form, and are merely a possible presentation form. In a specific implementation process of this embodiment of this application, the image quality evaluation module and the image difference comparison module are used to obtain a quality evaluation value of an image frame and a difference value between image frames, so that the electronic device determines, based on the quality evaluation value and the difference value, whether the image frame meets a storage condition, and stores the image frame when the condition is met. Therefore, presentation forms of the image quality evaluation module and the image difference comparison module are not limited in this embodiment of this application. For example, the image quality evaluation module and the image difference comparison module may exist in a line in a form of serial connection.

The foregoing descriptions about implementations allow a person skilled in the art to understand that, for the purpose of convenient and brief description, division of the foregoing functional modules is taken as an example for illustration. In actual application, the foregoing functions can be allocated to different modules and implemented according to a requirement, that is, an inner structure of an apparatus is divided into different functional modules to implement all or some of the functions described above. For a detailed working process of the foregoing system, apparatus, and unit, refer to a corresponding process in the foregoing method embodiments, and details are not described herein again.

Functional units in embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of embodiments of this application essentially, or the part contributing to the conventional technology, or all or some of the technical solutions may be implemented in the form of a software product. The computer software product is stored in a storage medium and includes several instructions for instructing a computer device (which may be a personal computer, a server, or a network device) or a processor to perform all or some of the steps of the methods described in embodiments of this application. The foregoing storage medium includes any medium that can store program code, such as a flash memory, a removable hard disk, a read-only memory, a random access memory, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An electronic device, comprising:
a memory configured to store computer instructions; and
one or more processors coupled to the memory and configured to execute the computer instructions to cause the electronic device to:
collect a first image frame within a first duration, wherein every m first image frames consecutively collected within the first duration are a group of image frames, wherein m is based on a total quantity F of image frames collected within the first duration and a maximum frame quantity N, wherein the total quantity F is a quantity of image frames that can be collected within the first duration using a first frame rate, and wherein the total quantity F is greater than the maximum frame quantity N; and
store, into a first storage space, a second image frame that meets an image quality condition and that is in the first image frame, wherein the second image frame meets the image quality condition when:
an image quality of the second image frame is a highest image quality in a group in which the first image frame is located; or
the image quality of the second image frame is higher than a first image quality, a difference value between image content of adjacent second image frames is greater than a first value, a quantity of the second image frames that belong to a $K^{th}$ group of image frames is equal to 1 when K is equal to 1, and a quantity of the second image frames that belong to a $K^{th}$ group of image frames is less than or equal to (K−1) when K is greater than or equal to 2.

2. The electronic device of claim 1, wherein the one or more processors is further configured to execute the computer instructions to cause the electronic device to store the second image frame by storing an image frame $f_1$ into the first storage space when the image frame $f_1$ in each group of image frames is collected, and wherein the image frame $f_1$ is a first collected image frame in each group of image frames.

3. The electronic device of claim 2, wherein the first storage space in each group of image frames stores a third image frame, wherein the third image frame belongs to a same group of image frames as an image frame $f_h$, and wherein after the image frame $f_1$ in each group of image frames is collected, the one or more processors is further configured to execute the computer instructions to cause the electronic device to:
- overwrite, when the image frame $f_h$ in each group of image frames is collected and when image quality of the image frame $f_h$ is higher than that of the third image frame, the third image frame using the image frame $f_h$ and storing the image frame $f_h$; and
- skip, when image quality of the image frame $f_h$ is lower than that of the third image frame, performing any operation, wherein the image frame $f_h$ is an image frame whose collection time sequence is in an $h^{th}$ sequential position in each group of image frames, and $2 \leq h \leq m$.

4. The electronic device of claim 1, wherein an image frame $f_{kh}$ represents an $h^{th}$ image frame in a $K^{th}$ group of image frames, K is a positive integer, h is a positive integer, and $h \leq m$; the $K^{th}$ group of image frames refers to a group of image frames whose collection time sequence is in a $K^{th}$ sequential position within the first duration; and the $h^{th}$ image frame refers to an image frame whose collection time sequence is in an $h^{th}$ sequential position in the $K^{th}$ group of image frames; $\Delta$ represents a difference value between the image frame $f_{kh}$ and a fourth image frame, the fourth image frame represents an image frame that is last stored in the first storage space within the first duration, a larger value of $\Delta$ indicates a larger difference between image content presented by the image frame $f_{kh}$ and image content presented by the fourth image frame, and $\Delta_{thrd}$ is the first value; $Q_{fkh}$ represents image quality of the image frame $f_{kh}$, $Q_{thrd}$ represents the first image quality, and $Q_{last}$ represents image quality of the fourth image frame; and an initial value of an integer value X is w, wherein w is an integer.

5. The electronic device of claim 4, wherein the one or more processors is further configured to execute the computer instructions to cause the electronic device to store the second image frame by storing an image frame $f_{11}$ into the first storage space when the image frame $f_{11}$ is collected.

6. The electronic device of claim 5, wherein after the image frame $f_{11}$ is collected, the one or more processors is further configured to execute the computer instructions to cause the electronic device to store the image frame $f_{kh}$ into the first storage space when the image frame $f_{kh}$ is collected, when the image frame $f_{kh}$ and the fourth image frame do not belong to a same group of image frames, when $\Delta > \Delta_{thrd}$, and when $Q_{fkh} > Q_{thrd}$.

7. The electronic device of claim 5, wherein after the image frame $f_{11}$ is collected, the one or more processors is further configured to execute the computer instructions to cause the electronic device to perform an update so that $X = X+1$ when the image frame $f_{kh}$ is collected, when the image frame $f_{kh}$ and the fourth image frame do not belong to a same group of image frames, when $h = m$, and when $\Delta \leq \Delta_{thrd}$ or $Q_{fkh} \leq Q_{thrd}$.

8. The electronic device of claim 5, wherein after the image frame $f_{11}$ is collected, the one or more processors is further configured to execute the computer instructions to cause the electronic device to:
- perform an update so that $X = X-1$ when the image frame $f_{kh}$ is collected, when the image frame $f_{kh}$ and the fourth image frame belong to a same group of image frames, and when $\Delta > \Delta_{thrd}$, $Q_{fkh} > Q_{thrd}$, and $X > w$; and
- store the image frame $f_{kh}$ into the first storage space.

9. The electronic device of claim 5, wherein after the image frame $f_{11}$ is collected, the one or more processors is further configured to execute the computer instructions to cause the electronic device to:
- overwrite the fourth image frame using the image frame $f_{kh}$ when the image frame $f_{kh}$ is collected, when the image frame $f_{kh}$ and the fourth image frame belong to a same group of image frames, and when $\Delta \leq \Delta_{thrd}$, $Q_{fkh} > Q_{last}$, and $X > w$; and
- store the image frame $f_{kh}$ into the first storage space.

10. The electronic device of claim 5, wherein after the image frame $f_{11}$ is collected, the one or more processors is further configured to execute the computer instructions to cause the electronic device to:
- overwrite the fourth image frame using the image frame $f_{kh}$ when the image frame $f_{kh}$ is collected, when the image frame $f_{kh}$ and the fourth image frame belong to a same group of image frames, and when $X = w$ and $Q_{fkh} > Q_{last}$; and
- store the image frame $f_{kh}$ into the first storage space.

11. A wireless communications system, comprising:
- a second electronic device; and
- a first electronic device communicatively connected to the second electronic device and configured to:
  - collect a first image frame within a first duration, wherein every m first image frames consecutively collected within the first duration are a group of image frames, wherein m is based on a total quantity F of image frames collected within the first duration and a maximum frame quantity N, wherein the total quantity F is a quantity of image frames that can be collected by the first electronic device within the first duration using a first frame rate, wherein the total quantity F is greater than the maximum frame quantity N, wherein a maximum frame quantity of image frames that are allowed to be stored in a first storage space of the first electronic device is N, and wherein N is a positive integer;
  - store, into the first storage space, a second image frame that meets an image quality condition and that is in the first image frame, wherein the image quality condition comprises:
    - an image quality of the second image frame is a highest image quality in a group in which the first image frame is located; or
    - the image quality of the second image frame is higher than a first image quality, a difference value between image content of adjacent second image frames is greater than a first value, a quantity of the second image frames that belong to a $K^{th}$ group of image frames is equal to 1 when K is equal to 1, and a quantity of the second image frames that belong to a $K^{th}$ group of image frames is less than or equal to (K−1) when K is greater than or equal to 2;
  - receive, from the second electronic device, a first data packet comprising a photographing instruction based on a first operation;
  - determine, according to the photographing instruction, Z second image frames from the second image frame stored in the first storage space, wherein Z is a positive integer; and
  - send, to the second electronic device, the Z second image frames to display or store.

12. The wireless communications system of claim 11, wherein the first electronic device is configured to store the second image frame by storing an image frame $f_1$ into the first storage space when the image frame $f_1$ in each group of image frames is collected, wherein the image frame $f_1$ is a first collected image frame in each group of image frames.

13. The wireless communications system of claim 12, wherein the first storage space in each group of image frames stores a third image frame, wherein the third image frame belongs to a same group of image frames as an image frame $f_h$, and wherein after the image frame $f_1$ in each group of image frames is collected, the one or more processors is further configured to execute the computer instructions to cause the first electronic device to:
   overwrite, when the image frame $f_h$ in each group of image frames is collected and when image quality of the image frame $f_h$ is higher than that of the third image frame, the third image frame using the image frame $f_h$ and store the image frame $f_h$; and
   skip, when the image frame $f_h$ in each group of image frames is collected and when image quality of the image frame $f_h$ is lower than that of the third image frame, performing any operation, wherein the image frame $f_h$ is an image frame whose collection time sequence is in an $h^{th}$ sequential position in each group of image frames, and wherein $2 \leq h \leq m$.

14. The wireless communications system of claim 13, wherein an image frame $f_{kh}$ represents an $h^{th}$ image frame in a $K^{th}$ group of image frames, K is a positive integer, h is a positive integer, and $h \leq m$; the $K^{th}$ group of image frames refers to a group of image frames whose collection time sequence is in a $K^{th}$ sequential position within the first duration; and the $h^{th}$ image frame refers to an image frame whose collection time sequence is in an $h^{th}$ sequential position in the $K^{th}$ group of image frames;
   $\Delta$ represents a difference value between the image frame $f_{kh}$ and a fourth image frame, the fourth image frame represents an image frame that is last stored in the first storage space within the first duration, a larger value of $\Delta$ indicates a larger difference between image content presented by the image frame $f_{kh}$ and image content presented by the fourth image frame, and $\Delta_{thrd}$ is the first value;
   $Q_{fkh}$ represents image quality of the image frame $f_{kh}$, $Q_{thrd}$ represents the first image quality, and $Q_{last}$ represents image quality of the fourth image frame; and
   an initial value of an integer value X is w, wherein w is an integer.

15. The wireless communications system of claim 14, wherein the first electronic device is configured to store the second image frame by storing an image frame $f_{11}$ into the first storage space when the image frame $f_{11}$ is collected.

16. The wireless communications system of claim 15, wherein after the image frame $f_{11}$ is collected, the one or more processors is further configured to execute the computer instructions to cause the first electronic device to store, when the image frame $f_{kh}$ is collected, when the image frame $f_{kh}$ and the fourth image frame do not belong to a same group of image frames, and when $\Delta > \Delta_{thrd}$ and $Q_{fkh} > Q_{thrd}$, the image frame $f_{kh}$ into the first storage space.

17. The wireless communications system of claim 15, wherein after the image frame $f_{11}$ is collected, the one or more processors is further configured to execute the computer instructions to cause the first electronic device to perform an update so that $X=X+1$ when the image frame $f_{kh}$ is collected, when the image frame $f_{kh}$ and the fourth image frame do not belong to a same group of image frames, when $h=m$, and when $\Delta \leq \Delta_{thrd}$ or $Q_{fkh} \leq Q_{thrd}$.

18. The wireless communications system of claim 15, wherein after the image frame $f_{11}$ is collected, the one or more processors is further configured to execute the computer instructions to cause the first electronic device to:
   perform, when the image frame $f_{kh}$ is collected, when the image frame $f_{kh}$ and the fourth image frame belong to a same group of image frames, and when $\Delta > \Delta_{thrd}$, $Q_{fkh} > Q_{thrd}$, and $X > w$, an update so that $X=X-1$; and
   store the image frame $f_{kh}$ into the first storage space.

19. The wireless communications system of claim 15, wherein after the image frame $f_{11}$ is collected, the one or more processors is further configured to execute the computer instructions to cause the first electronic device to:
   overwrite, when the image frame $f_{kh}$ is collected, when the image frame fkh and the fourth image frame belong to a same group of image frames, and when $\Delta \leq \Delta_{thrd}$, $Q_{fkh} > Q_{last}$, and $X > w$, the fourth image frame using the image frame $f_{kh}$; and
   store the image frame $f_{kh}$ into the first storage space.

20. The wireless communications system of claim 15, wherein after the image frame $f_{11}$ is collected, the one or more processors is further configured to execute the computer instructions to cause the first electronic device to:
   overwrite, when the image frame $f_{kh}$ is collected when the image frame $f_{kh}$ and the fourth image frame belong to a same group of image frames, and when $X=w$ and $Q_{fkh} > Q_{last}$, the fourth image frame using the image frame $f_{kh}$; and
   store the image frame $f_{kh}$ into the first storage space.

\* \* \* \* \*

UNITED STATES PATENT AND TRADEMARK OFFICE
CERTIFICATE OF CORRECTION

PATENT NO. : 12,430,706 B2  
APPLICATION NO. : 18/251331  
DATED : September 30, 2025  
INVENTOR(S) : Xi Chen Page 1 of 1

It is certified that error appears in the above-identified patent and that said Letters Patent is hereby corrected as shown below:

In the Claims

Claim 19, Column 34, Line 33: "frame fkh and" should read "frame $f_{kh}$ and"

Signed and Sealed this  
Second Day of December, 2025

John A. Squires  
*Director of the United States Patent and Trademark Office*